United States Patent
Ha

(10) Patent No.: US 10,425,246 B2
(45) Date of Patent: *Sep. 24, 2019

(54) LAUNDRY MACHINE AND ONLINE SYSTEM INCLUDING THE SAME

(71) Applicant: LG ELECTRONICS INC., Seoul (KR)

(72) Inventor: Mikyung Ha, Changwon-si (KR)

(73) Assignee: LG Electronics Inc., Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 15/697,987

(22) Filed: Sep. 7, 2017

(65) Prior Publication Data

US 2018/0069721 A1  Mar. 8, 2018

Related U.S. Application Data

(63) Continuation of application No. 14/234,896, filed as application No. PCT/KR2012/006032 on Jul. 27, 2012, now Pat. No. 9,800,430.

(30) Foreign Application Priority Data

Jul. 27, 2011  (KR) .......................... 10-2011-0074769

(51) Int. Cl.
  *G06F 9/44*  (2018.01)
  *H04L 12/28*  (2006.01)
  (Continued)

(52) U.S. Cl.
  CPC .......... *H04L 12/2818* (2013.01); *D06F 33/02* (2013.01); *D06F 39/005* (2013.01);
  (Continued)

(58) Field of Classification Search
  CPC ............ G05B 23/0272; H04L 12/2809; H04L 12/2825; H04L 12/2818; G08B 21/24
  See application file for complete search history.

(56) References Cited

U.S. PATENT DOCUMENTS 3,398,460 A  8/1968  Elders
6,121,593 A  9/2000  Mansbery
(Continued)

FOREIGN PATENT DOCUMENTS

CN  1343806  4/2002
CN  1359214  7/2002
(Continued)

OTHER PUBLICATIONS

United States Office Action dated Dec. 14, 2018 issued in co-pending related U.S. Appl. No. 15/695,660.
(Continued)

*Primary Examiner* — Tuan A Vu
(74) *Attorney, Agent, or Firm* — KED & Associates, LLP

(57) ABSTRACT

The present invention relates to a home appliance which can communicate with an outside of the home appliance and an online system including the same. According to embodiments of the present invention, an online system may be provided, including a server, a home appliance provided with remote control activation input means and connected to the server to enable communication therewith, and an external terminal having application for remote control of the home appliance through the server, wherein the home appliance is remotely controlled through the external terminal only if the remote control activation input means is selected.

23 Claims, 26 Drawing Sheets

(51) Int. Cl.
  *D06F 33/02* (2006.01)
  *D06F 39/00* (2006.01)
  *H04L 12/24* (2006.01)
(52) U.S. Cl.
  CPC ...... *H04L 12/2825* (2013.01); *D06F 2210/00* (2013.01); *H04L 41/082* (2013.01); *H04L 2012/285* (2013.01); *H04L 2012/2841* (2013.01)

(56) References Cited

U.S. PATENT DOCUMENTS

| | | |
|---|---|---|
| 6,967,766 B2 | 11/2005 | Reeder et al. |
| 7,136,940 B2 | 11/2006 | Roh et al. |
| 7,196,623 B1 | 3/2007 | Wang |
| 7,363,031 B1 | 4/2008 | Aisa |
| 7,464,426 B2 | 12/2008 | Lee |
| 7,526,539 B1 | 4/2009 | Hsu |
| 7,603,119 B1 | 10/2009 | Durig |
| 7,693,546 B1 | 4/2010 | Gioscia |
| 7,742,951 B2 | 6/2010 | Ebrom et al. |
| 8,666,634 B2 | 10/2014 | Williamson |
| 9,791,838 B2 | 10/2017 | Park et al. |
| 9,800,430 B2 | 10/2017 | Ha |
| 9,948,478 B2 | 4/2018 | Ha |
| 2002/0032491 A1 | 3/2002 | Imamura |
| 2002/0065770 A1 | 5/2002 | Ebata |
| 2002/0075160 A1 | 6/2002 | Racz et al. |
| 2002/0095483 A1 | 7/2002 | Lee |
| 2002/0180579 A1 | 12/2002 | Nagaoka |
| 2003/0051040 A1 | 3/2003 | Tanikawa |
| 2003/0100962 A1 | 5/2003 | Sumita et al. |
| 2003/0171113 A1 | 9/2003 | Choi |
| 2003/0178894 A1 | 9/2003 | Ghent |
| 2004/0002779 A1 | 1/2004 | Shimba et al. |
| 2004/0158620 A1 | 8/2004 | Ha et al. |
| 2004/0249961 A1 | 12/2004 | Katsube |
| 2005/0033647 A1 | 2/2005 | Crisp, III |
| 2005/0050647 A1 | 3/2005 | Tanaka |
| 2005/0054329 A1 | 3/2005 | Kokudo |
| 2005/0088276 A1 | 4/2005 | Lee et al. |
| 2005/0096788 A1 | 5/2005 | Peterson |
| 2005/0108326 A1 | 5/2005 | Tuttle |
| 2005/0131991 A1 | 6/2005 | Ogawa et al. |
| 2005/0162273 A1 | 7/2005 | Yoon |
| 2005/0201393 A1 | 9/2005 | Hatayama |
| 2006/0208066 A1 | 9/2006 | Finn |
| 2006/0220834 A1* | 10/2006 | Maeng .................. G08B 21/24 340/539.1 |
| 2006/0239208 A1 | 10/2006 | Roberts |
| 2007/0005955 A1 | 1/2007 | Pyle et al. |
| 2007/0046493 A1 | 3/2007 | Park et al. |
| 2007/0053513 A1 | 3/2007 | Hoffberg |
| 2007/0118638 A1* | 5/2007 | Ban .................. G05B 23/0272 709/224 |
| 2007/0118862 A1 | 5/2007 | Jeong |
| 2007/0279248 A1 | 12/2007 | Matsumoto |
| 2008/0042868 A1 | 2/2008 | Lee et al. |
| 2008/0113683 A1 | 5/2008 | Paas |
| 2008/0132179 A1 | 6/2008 | Takeshita |
| 2008/0136581 A1 | 6/2008 | Heilman |
| 2008/0224834 A1 | 9/2008 | Oosaka et al. |
| 2009/0006970 A1 | 1/2009 | Jeffery et al. |
| 2009/0007346 A1 | 1/2009 | Ha |
| 2009/0090137 A1 | 4/2009 | Jeong et al. |
| 2009/0138107 A1 | 5/2009 | Ha |
| 2009/0170532 A1 | 7/2009 | Lee |
| 2009/0195349 A1 | 8/2009 | Frader-Thompson |
| 2009/0195404 A1 | 8/2009 | Combs, Jr. |
| 2009/0217335 A1 | 8/2009 | Wong |
| 2009/0322550 A1 | 12/2009 | Yu |
| 2010/0095716 A1 | 4/2010 | Bae |
| 2010/0115788 A1 | 5/2010 | Kim |
| 2010/0165879 A1 | 7/2010 | Gupta et al. |
| 2010/0185537 A1 | 7/2010 | Bari |
| 2010/0217837 A1 | 8/2010 | Ansari |
| 2010/0286801 A1* | 11/2010 | Yum .................. H04L 12/2809 700/90 |
| 2010/0296441 A1 | 11/2010 | Barkan |
| 2011/0007901 A1 | 1/2011 | Ikeda |
| 2011/0012738 A1 | 1/2011 | Nakamura |
| 2011/0054967 A1* | 3/2011 | Han .................. H04L 12/2825 705/7.13 |
| 2011/0082933 A1 | 4/2011 | Zhou |
| 2011/0103264 A1 | 5/2011 | Wentink |
| 2011/0137430 A1 | 6/2011 | Kohanek |
| 2011/0153110 A1 | 6/2011 | Drake |
| 2011/0215919 A1 | 9/2011 | Hernandez |
| 2011/0230236 A1 | 9/2011 | Tsai et al. |
| 2011/0238865 A1 | 9/2011 | Terashima et al. |
| 2011/0256850 A1 | 10/2011 | Selander |
| 2011/0312278 A1 | 12/2011 | Matsushita |
| 2012/0019674 A1 | 1/2012 | Ohnishi |
| 2012/0056827 A1 | 3/2012 | Kim |
| 2012/0110747 A1 | 5/2012 | Yum |
| 2012/0147802 A1 | 6/2012 | Ukita et al. |
| 2012/0154108 A1 | 6/2012 | Sugaya |
| 2012/0296489 A1 | 11/2012 | Lee |
| 2012/0316984 A1 | 12/2012 | Glassman |
| 2013/0006400 A1 | 1/2013 | Caceres |
| 2013/0042416 A1 | 2/2013 | Balinski |
| 2013/0049607 A1 | 2/2013 | Urata |
| 2013/0106613 A1 | 5/2013 | Lee |
| 2013/0135116 A1 | 5/2013 | Garbe |
| 2013/0185079 A1 | 7/2013 | Park |
| 2013/0254310 A1 | 9/2013 | Krywaniuk |
| 2013/0268134 A1 | 10/2013 | Tuller |
| 2013/0346300 A1 | 12/2013 | Kang |
| 2015/0323915 A1 | 11/2015 | Warren |

FOREIGN PATENT DOCUMENTS

| | | |
|---|---|---|
| CN | 1452352 | 10/2003 |
| CN | 1499162 | 5/2004 |
| CN | 1598770 | 3/2005 |
| CN | 1606282 | 4/2005 |
| CN | 1623134 | 6/2005 |
| CN | 1714191 | 12/2005 |
| CN | 1770714 | 5/2006 |
| CN | 1893529 | 1/2007 |
| CN | 1921528 A | 2/2007 |
| CN | 101022341 | 8/2007 |
| CN | 101167305 A | 4/2008 |
| CN | 201588102 | 9/2010 |
| CN | 101873343 | 10/2010 |
| CN | 201770893 | 3/2011 |
| CN | 102043404 | 5/2011 |
| CN | 102409508 | 4/2012 |
| CN | 103718505 | 4/2014 |
| DE | 10 2010 063 083 A1 | 6/2012 |
| EP | 1 217 475 | 6/2002 |
| EP | 1 402 101 A1 | 3/2004 |
| EP | 1 779 762 A1 | 5/2007 |
| EP | 1 852 543 A1 | 11/2007 |
| EP | 2 662 482 A2 | 11/2013 |
| EP | 2 662 485 A2 | 11/2013 |
| EP | 2 737 660 A2 | 6/2014 |
| EP | 2737659 | 6/2014 |
| JP | 2003-071178 | 3/2003 |
| JP | 2003-209892 A | 7/2003 |
| JP | 2003-225491 A | 8/2003 |
| JP | 2004-096591 | 3/2004 |
| JP | 2004-350930 A | 12/2004 |
| JP | 2005-034186 | 2/2005 |
| JP | 2005-102060 | 4/2005 |
| JP | 2005-110967 | 4/2005 |
| JP | 2005-185460 A | 7/2005 |
| JP | 2006-314806 A | 11/2006 |
| JP | 2009-135783 | 6/2009 |
| KR | 10-2003-0045238 | 6/2003 |
| KR | 10-2003-0054234 A | 7/2003 |
| KR | 10-2003-0064722 A | 8/2003 |
| KR | 10-2004-0045657 A | 6/2004 |
| KR | 10-2004-0069530 A | 8/2004 |

(56) References Cited

FOREIGN PATENT DOCUMENTS

| | | |
|---|---|---|
| KR | 10-2005-0078542 A | 8/2005 |
| KR | 10-0634798 | 10/2006 |
| KR | 10-2008-0024307 A | 3/2008 |
| KR | 10-2009-0041687 | 4/2009 |
| KR | 10-2009-0095351 | 9/2009 |
| KR | 10-2011-0131655 A | 12/2011 |
| KR | 10-2012-0023497 A | 3/2012 |
| TW | M391242 | 10/2010 |
| WO | WO 03/004733 A1 | 7/2002 |
| WO | WO 2006/106393 A2 | 10/2006 |
| WO | WO 2010/131817 | 11/2010 |
| WO | WO 2012/093897 A2 | 7/2012 |
| WO | WO 2013/015655 | 1/2013 |
| WO | WO 2013/015656 A2 | 1/2013 |

OTHER PUBLICATIONS

Notice of Allowance dated Dec. 5, 2017 issued in co-pending U.S. Appl. No. 14/238,694.
European Search Report dated Nov. 21, 2013 issued in Application No. 13 18 3129.
"Samsung rolls out smart appliances at CES 2012 (smart fridge, Android powered washer and dryer)", YouTube video, uploaded Jan. 14, 2012, https://www.youtube.com/watch?y=ZAhiHY5KtXk.
"Smart Appliances Steal the Show at CES 2012", Jan. 21, 2012, https://plassappliance.worldpress.com/2012/01/21/smart-appliances-steal-the-show-at-ces-2012/.
European Notice of Opposition dated Jan. 15, 2016 issued in Application No. 13183129.9 (with English translation).
European Notice of Opposition dated Jan. 18, 2016 issued in Application No. 13183129.9 (with English translation).
U.S. Office Action issued in parent U.S. Appl. No. 14/017,517 dated Feb. 6, 2016.
Chinese Office Action dated Apr. 1, 2016 issued in Application No. 201310403718.0 (with English translation).
U.S. Office Action issued in parent U.S. Appl. No. 14/017,517 dated Jun. 9, 2016.
U.S. Office Action issued in parent U.S. Appl. No. 14/017,517 dated Nov. 4, 2016.
Thomas Ricker, "LG Thinq linqs your smart appliances with WiFi and smart apps", Jan. 4, 2011, pp. 1-9 ,LG_thinQ.pdf>.
Sorcinelli, Don, "Rethinking Device Convergence—The Video Experience," Dec. 6, 2011 (accessed from https://web.archive.org/web/20111206143144/http://www.bostonpocketpc.com/CategoryView.category.Editorial.aspx on Aug. 31, 2015.
Steele, Billy, "Samsung WiFi Washer and Dryer hands-on (video)," Jan. 10, 2012 (accessed from http://www.engadget.com/2012/01/10/samsung-smarthome-wifi-washer-and-dryer-hands-on-video/ on Jan. 14, 2014.
International Search Report issued in Application No. PCT/KR2012/006034 dated Jan. 24, 2013.
International Search Report issued in Application No. PCT/KR2012/006032 dated Jan. 25, 2013.
Korean Notice of Allowance dated May 16, 2013 issued in Application No. 10-2011-0074770 (with English translation).
European Search. Report dated Jan. 28, 2014 issued in Application No. 13 183 127.3.
Philips: "Philips DS8800W/37 User Manual"; Jan. 1, 2011, pp. 1-26; Retrieved from the Internet on Feb. 12, 2015: URL:http://download.p4c.philips.com/files/d/ds8800w37/ds8800w37dfuaen.pdf; (XP-002735886).
European Search Report dated. Dec. 12, 2014 issued in Application No. 12 817 390.3.
Philips: "Philips DS9800W Registreerige oma toode 1-10 ja saage abi veebilehelt"; Jul. 8, 2011; pp. 1-16; Retrieved from the Internet on Feb. 13, 2015: URL:http://download.p4c.philips.com/files/d/ds9800w10/ds9800w10dfuest.pdf; (XP-002735931).
European Search Report dated Mar. 4, 2015 issued in Application No. 12817976.9.
Chinese Office Action dated Feb. 22, 2016 issued in Application No. 200680014710.3 (with English translation).
Samsung, "WF457ARG Washing Machine User Manual," Mar. 9, 2012 (accessed from http://www.homedepot.com/catalog/pdfimages/8d/8de09998-0044-4gbb2-b56b-80dae1a939f5.pdf, on Jan. 11, 2016.
HowardForums.com: Samsung Washer/Dryer that can be controlled with phone, howardchui, YouTube, Feb. 24, 2012 (accessed from https://www.youtube.com/watch?v=NTGnbYuXtzs on Jan. 15, 2016.
Chinese Office Action dated Jan. 27, 2016 issued in Application No. 201280037644.7 (English Translation Attached).
U.S. Office Action dated Jan. 29, 2016 issued in U.S. Appl. No. 14/018,090.
Australian Notice of Acceptance for Application 2013224716 dated Mar. 23, 2016 (Advertised Apr. 21, 2016).
Chinese Office Action for Application 201310403925.6 dated May 5, 2016 (full Chinese text and full English-language translation).
Chinese Office Action for Application 2012-80037644 dated Sep. 12, 2016 (full Chinese text and English language translation).
U.S. Office Action dated Oct. 27, 2016 issued in U.S. Appl. No. 14/018,090.
Chinese Office Action issued in Application 201280037644.7 dated Dec. 21, 2016 (full Chinese Text and full English translation).
Chinese Patent Certificate issued in Application 201310403718 dated Apr. 12, 2017 (full Chinese text).
U.S. Notice of Allowance issued in parent U.S. Appl. No. 14/017,517 dated Jun. 2, 2017.
United States Office Action dated Aug. 23, 2017 issued in co-pending related U.S. Appl. No. 14/018,090.
Korean Notice of Allowance issued in Application 10-2012-0098946 dated Aug. 13, 2017 (English translation only).
United States Office Action dated May 15, 2018 issued in co-pending related U.S. Appl. No. 15/612,528.
Japanese Notice of Allowance dated Jan. 29, 2019 issued in Application No. 2013-184329.
European Office Action dated Feb. 13, 2019 issued in Application No. 12825863.9.
United States Office Action dated Aug. 7, 2019 issued in co-pending related U.S. Appl. No. 15/915,762.
U.S. Appl. No. 15/915,762, filed Mar. 8, 2018.
U.S. Appl. No. 15/918,294, filed Mar. 12, 2018.
U.S. Appl. No. 16/263,831, filed Jan. 31, 2019.

\* cited by examiner

FIG. 17

| Indicator |
|---|
| Smart Remote Control |

Input ID and Password Registered to (http://kr.smartthinq.com) Site.
If You have no ID,
Log in after signup to the site

| Select the Present Country |

| ID |

| Password |

☐ Automatic Storage ( Log in )

( Product Registering Method )

FIG. 28

Washing is Finished

FIG. 29

Under Crumple Prevention

The Washing Machine Will Run for 4 Hours for Prevention of Crumple After Washing is Finished.

Press Button Any Time If You Want to Take out the Laundry.

The Washing Machine will Stop.

LAUNDRY MACHINE AND ONLINE SYSTEM INCLUDING THE SAME

CROSS-REFERENCE TO RELATED PATENT APPLICATIONS

This application is a Continuation Application of U.S. National Stage Application 14/234,896, filed Jan. 24, 2014, under 35 U.S.C. § 371 of PCT Application No. PCT/KR2012/006032, filed Jul. 27, 2012, which claims priority to Korean Patent Application No. 10-2011-0074769, filed Jul. 27, 2011, the subject matters of which are incorporated herein by reference.

TECHNICAL FIELD

The present invention relates to a laundry machine, and more particularly, to a laundry machine which can perform, not only original functions of the laundry machine, but also additional functions by communication with an outside of the laundry machine. The additional functions include extended functions from the original functions of the laundry machine and include new functions which have no relation to the original functions of the laundry machine. Such a laundry machine may be called as a smart laundry machine.

The present invention also relates to an online system including the smart laundry machine, which enables to use the smart laundry machine at a low cost, easily.

The present invention also relates to a smart home appliance in a further extended mode, and an online system including the same, and a method for using an online system.

BACKGROUND ART

A washing machine which washes clothes is a typical laundry machine, and a dryer which dries clothes may also be called as the laundry machine. Of course, a washing and drying machine which can wash and dry clothes may also be called as the laundry machine.

Recently, a refresher which refreshes clothes, not with water, but with hot air or steam, is introduced to marketplaces, and may also be called as the laundry machine.

Along with this, a dishwasher may also be called as the laundry machine, though the dishwasher does not wash the clothes. Therefore, the laundry machine in this specification includes all of the different kinds of machines described above.

The specification will describe the laundry machine taking a washing machine as a typical example. The laundry machine is applicable to other kinds of laundry machine if the laundry machine does not exclude, or in contrary, to the other kind of laundry machine.

FIG. 1 illustrates a schematic view of a control panel in a related art washing machine, which is also applicable to the present invention.

The control panel is provided for interfacing with a user. Therefore, in general, the control panel is provided to a front of the washing machine for user's easy access and operation. The control panel has various buttons for user's operation, and may have various display units for providing information to the user.

A main function of the washing machine is washing. Accordingly, the washing machine is provided with a course selection unit 110 or a main function selection unit for selecting various washing courses, for the user to select a course. As an example, the course selection unit 110 may be provided in a shape of a rotary knob. In order to make user's course selection easy, a course indicating unit 111 may be provided to the control panel 100, for enabling the user to select a desired washing course by handling the course selection unit 110 to match with the course indicating unit.

FIG. 1 illustrates a schematic view showing the course indicating unit 111 having different washing courses indicated thereon around the rotary knob 110 so that the user may select a washing course by turning the rotary knob 110. In order to indicate washing course selected thus, an indicating unit 121 may be provided, and with reference to this, the user may notice the washing course selected thus easily. The indicating unit 121 may be embodied with a flashing LED or the like.

An option selection unit 120 may be provided for adding functions to, or changing, the main functions. The option selection unit 120 may be provided in a variety of modes. As an example, FIG. 1 illustrates the option selection unit 120 which enables to select options related to washing, rinsing, spinning, a water temperature, drying, steam, and scheduled operation. An option indicating unit 122 may also be provided, which may indicate selected the option, embodied with an LED the same as before.

The control panel 100 may be provided with a state indicating unit 130 for indicating a state of the washing machine. The state indicating unit 130 may indicate the present operation state of the washing machine, a user's course or option selection state, information on time, and so on.

For an example, if the washing machine performs a rinsing step presently, the state indicating unit 130 may indicate "in a rinsing step.". If the washing machine is waiting for a user's course input, the state indicating unit 130 may indicate "Please input a washing course". And, the state indicating unit 130 may indicate the present time, or a time period (A remained time period) until the washing machine carries out an entire washing course to finish operation.

In the meantime, the control panel 100 may be provided with a power selection unit 140 for applying or cutting off power to the washing machine, and a run/pause selection unit 150 for putting the washing machine into operation or pause.

The control panel 100 described before and the washing machine including the same have the following problems.

Besides a configuration for basic user interface, the control panel 100 is difficult to embody additional user interface due to a problem front a view point of space. Of course, though a complicate user interface may be embodied at the control panel 100, the complicate user interface has a problem in that user's excessive concentration and knowledge on operation is required. And, since the control panel 100 has difficulty in fabrication and requires a large sized memory, the washing machine itself becomes expensive too much.

Along with this, since the selection units 110 and 120 and the indicating units 111, 121, and 122 have respective functions set already, extension of the functions are not easy.

And, in general, the washing machine is positioned at a washing room which is not a place the user accesses thereto, frequently. Therefore, the user can not but has much trouble of personally entering in the washing room and accessing to the washing machine only for using the washing machine. And, even if different pieces of information are indicated with the indicating units 111, 121, 122, and 130, the indication of information may be meaningless if the user does not access to the washing machine, personally.

Consequently, it is required to provide a laundry machine which can carry out, not only the original functions of the laundry machine, but also the extended functions from the original functions of the laundry machine or new functions not related to the original functions of the laundry machine.

Along with this, it is required to provide a laundry machine which can embody the extended functions or the new functions without requiring replacement or modification of the existing control panel, i.e., without changing hardware of the washing machine.

In the meantime, the problems are not problems limited to the laundry machine, merely. The problems may be the same even to home appliances, such as refrigerators, ovens, air conditioners, robot cleaners, too. This is because each of the home appliances has a configuration matching to the control panel of the laundry machine, i.e., a configuration for user interface. Also, this is because each of the home appliances has selection units and indicating units matched to the selection units for carrying out respective original functions of the home appliances, and requirements for embodying extension of functions and embodying new functions are the same with the laundry machine. That is, the extension of the user interface is difficult even to many of the borne appliances due to limitations on space or cost.

Accordingly, the specification will be described focused on a washing machine as a typical example of the home appliances, and may be applicable to other home appliances as far as the home appliance is not exclusive and contrary to other home appliances.

DISCLOSURE OF INVENTION

Technical Problem

To solve the problems, an object of the present invention is to provide a home appliance.

An object of the present invention is to provide a home appliance which can carry out, not only the original functions of the home appliance, but also functions extended further or new functions by embodiments of the present invention.

Another object of the present invention is to provide a home appliance which is made to enable to make communication with an outside of the home appliance for receiving different pieces of information from a server or an external terminal easily for extending functions of, and convenient use, of the home appliance by using the information by embodiments of the present invention; and an online system including the same.

Another object of the present invention is to provide a home appliance which is made to enable to make communication with an outside of the home appliance for transmitting different pieces of information on a laundry machine to a server or an external terminal for extending functions of, and convenient use, of the home appliance by using the information by embodiments of the present invention; and an online system including the same.

Another object of the present invention is to provide a home appliance which is made to make easy communication connection to an outside of the home appliance for convenient use of the home appliance by embodiments of the present invention; and an online system including the same.

Another object of the present invention is to provide a home appliance which enables a user to notice information on the home appliance easily without access to the home appliance personally and to control the home appliance by embodiments of the present invention; and an online system including the same.

Another object of the present invention is to provide a home appliance which enables to make easy and convenient communication connection of the home appliance that has no character input means by embodiments of the present invention.

Another object of the present invention is to provide a home appliance use of which is made convenient by enabling communication connection of the home appliance that has no display for displaying different pieces of information, and to diversify displayed information by embodiments of the present invention.

Another object of the present invention is to provide a home appliance, particularly, a washing machine, which can enhance user satisfaction and reliability by embodiments of the present invention.

Another object of the present invention is to provide an online system which enables to use online service related to a home appliance by using a server remotely or by using an external terminal easily by embodiments of the present invention.

Solution to Problem

As embodiments of the present invention, a laundry machine may be provided which can have remote management service request through an external terminal provided thereto. That is, a laundry machine is provided, which enables to request the remote management service through the external terminal without requesting to the laundry machine, personally.

The laundry machine may include a main controller, a display provided to receive user AP information to be communication connected the user information registered to a user site, and a WiFi communication module for transmitting user information and user AP information received at a display to the server or the user site to register the laundry machine to the server, and maintaining the communication connection to the server to have the remote management service requested from the laundry machine through the external terminal communication connected to the server after the registration. A display controller for controlling the display may be provided separate from the main controller, and it is preferable that the WiFi communication module is) vided to the display controller.

To achieve these objects and other advantages and in accordance with the purpose of the invention, as embodied and broadly described herein, a method for using an online system including the steps of transmitting user information to a server through an external terminal to log in the server, receiving the user information and home appliance information from the server in the step of log in, or receiving information on a particular home appliance of a plurality of home appliances from the server for requesting service for the particular home appliance after the step of log in, requesting state information on the home appliance to the server through the external terminal, the server requesting the state information to the home appliance after determination of the home appliance matching to the user information and the home appliance information, the server receiving the state information from the home appliance and transmitting the state information to the external terminal, and receiving the state information and displaying the state information on the external terminal.

In this instance, the laundry machine may include a washing machine, dryer, a washing and drying machine, a refresher. And, the laundry machine may be extended to other home appliances, such as a water purifier, an air conditioner, a robot cleaner, an oven, and a refrigerator. Therefore, a laundry machine in other embodiment may be extended to other home appliances as far as characteristics of the home appliances are not contrary to, or exclusive from, the laundry machine.

An embodiment of the present invention may provide a method for using an online system for a laundry machine to carry out a crumple preventive function, including the steps of receiving state information on a laundry machine through server and indicating the state information at an external terminal, if the state information indicated thus indicates that the laundry machine is carrying out a course, indicating a crumple prevention selection unit at the external terminal, to enable to select the crumple preventive function for preventing crumple from forming at the laundry by driving the drum after finishing carrying out the course, and if the crumple prevention selection unit is selected, transmitting crumple prevention selection information to a server.

An embodiment of the present invention may provide a method for using an online system, including the steps of receiving state information on a laundry machine through a server and indicating the state information at an external terminal, if the state information received and indicated thus indicates that the laundry machine is in scheduled operation, indicating that at least any one of a remained time period until finish of operation, a selected washing course, detailed option of a set course, and a scheduled operation time period change selection unit at an external terminal, if the scheduled operation time period change selection unit is selected, transmitting change information to the laundry machine through the server, to change the scheduled operation time period. The method may further includes the step of, if the scheduled operation time period is changed, indicating the scheduled operation time period change information at a display unit in the laundry machine.

And, the method may further includes, after a certain time period is passed from the scheduled operation time period change information at a display unit in the laundry machine, the step of indicating that the laundry machine is in scheduled operation at the display unit.

An embodiment of the present invention may provide a method for controlling a laundry machine having a control panel with a display unit for displaying operation state information thereon and provided to enable to communicate with a server, including the steps of indicating an operation state at the display unit while carrying out a selected course, receiving crumple preventive function set information from the server during, carrying out a washing course for preventing crumple from forming at the laundry by driving a drum after carrying out the course, and displaying the crumple preventive function set information at the display unit, and carrying out a crumple preventive function after finishing the washing course.

An embodiment of the present invention may provide an online system including a server, a home appliance provided with remote control activation input means and connected to the server to enable communication therewith, and an external terminal having application for remote control of the home appliance through the server, wherein the home appliance is remotely controlled through the external terminal only if the remote control activation input means is selected.

Along with this, it is preferable that n a state the remove control activation input means is not inputted, the external terminal monitors the state information of the home appliance through the server. That is, though the remote control of the hardware of the home appliance is not possible, it is desirable that the state of the home appliance is in what state. In a case of the washing machine, the external terminal can monitor the present state information, such as under secluded operation presently, under washing, under rinsing, and so on through the server.

An embodiment of the present invention provides a laundry machine WiFi communication connected to a server for receiving a remote control signal front the server and carrying out an operation received through the signal only in a state remote control activation means is inputted to the laundry machine.

The remote control may include carrying out control of a drum driving time and driving of the drum. Moreover, the remote control may include scheduled operation time period change, and carrying out crumple prevention after finishing the washing course. The remote control may include a crumple removal driving time period change.

In the meantime, the remote control may be controlling at least one of hardware of the laundry machine, such as a water supply valve, a drum, a heater, and a fan. Therefore, update, such as the firmware and the software, has no relation with the remove control. Therefore, the update of the firmware and the software can be carried out regardless of input of the remote control activation means.

Accordingly, a remote control activation means input state may imply a state in which scheduled washing operation or scheduled drying operation is inputted.

Along with this, an embodiment of the present invention may provide a recording medium having a method for using an online system stored therein.

The embodiments described before may be embodied compositely within a range the embodiments are not contrary to, or exclusive from, one another.

Advantageous Effects of Invention

An embodiment of the present invention provides a home appliance which is made to enable to make communication with an outside of the home appliance for transmitting different pieces of information on a laundry machine to a server or an external terminal for extending functions of, and convenient use, of the home appliance by using the information; and an online system including the same.

An embodiment of the present invention provides a home appliance which enables a user to notice information on the home appliance easily without access to the home appliance personally and to control the home appliance; and an online system including the same.

An embodiment of the present invention provides a laundry machine which can save a production cost of the laundry machine and enhance convenience of use by a function of the laundry machine that can be embodied though an external terminal by a user; and an online system including the same.

An embodiment of the present invention provides a home appliance, particularly, a washing machine, which can enhance user satisfaction and reliability by embodiments of the present invention.

An embodiment of the present invention provides an online system which enables to use online service related to a home appliance by using a server remotely or by using an external terminal, easily.

BRIEF DESCRIPTION OF DRAWINGS

The accompanying drawings, which are included to provide further understanding of the disclosure, and are incorporated in and constitute a part of this application, illustrate embodiments of the disclosure and together with the description serve to explain the principle of the disclosure.

In the drawings:

FIG. 17 illustrates a diagram showing an embodiment of a log-in frame of an external terminal.

FIG. 28 illustrates a diagram showing a frame of a display unit in a home appliance at the time of operation finish.

FIG. 29 illustrates a diagram showing an embodiment of a frame of a display unit in a home appliance at the time a crumple prevention function is carried out.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 2:
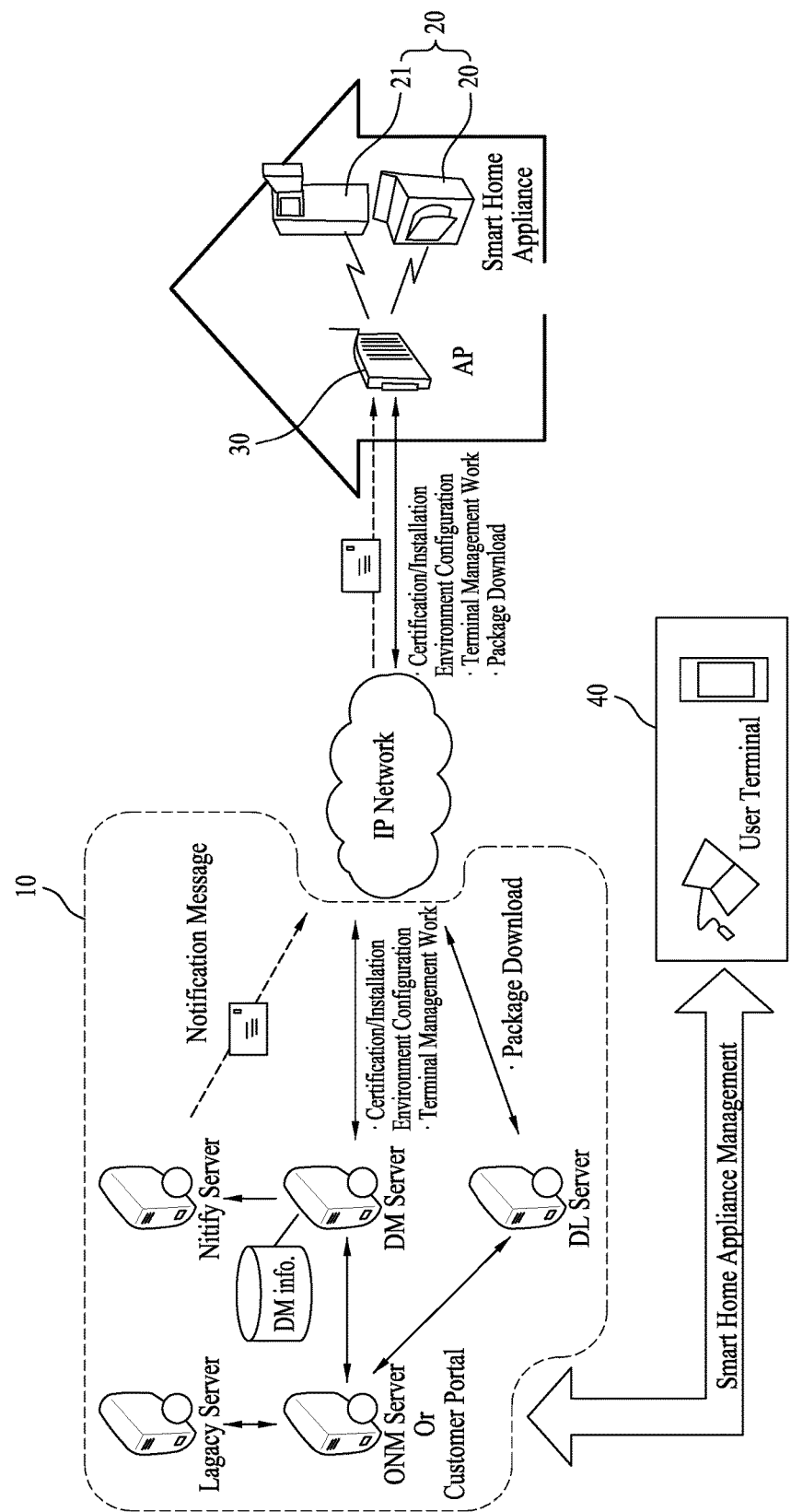
FIG. 2 illustrates a schematic view of an entire configuration in which servers, home appliances, and external terminals are interrelated, which may be embodied by an embodiment of the present invention.

FIG. 2 illustrates a schematic view of an embodiment of an online system which can embody the present invention, showing an entire configuration in which home appliances in a home are communication connected to, and managed by, a server.

In order to carry out remote management service, a server 10 is required for managing all of the home appliances to be managed. The home appliances 20 and 21 to be managed are communication connected to the server for carrying out an order transmitted from the server 10. A service request may be received at the server through the home appliance 20. Moreover, in order to receive the service request from the user through means other than the home appliance, separate means, such as an Internet site (Hereafter "User site", See FIG. 4), an external terminal or a user terminal 40, may be provided. Detail examples of the remote management service will be described, later.

In this instance, the external terminal or the user terminal 40 is a device provided separate from the home appliances or the server, such as a cellular phone, a smart phone, a notebook, and a computer having a communication module to enable communication with an outside of the device.

An enterpriser who carries out management of the home appliances can provide the remote management service by constructing the server. And, if required, the enterpriser may construct the user site described above.

The user may have the remote management service by purchasing a product 20 which can have the remote management service provided by the server 10. The product may be provided with a communication module for communication with the server 10 and a client side protocol for carrying out the order from the server. In the meantime, for an existing product which can not have the management service provided by the server, a separate device having the communication module and the client side protocol may be used. By purchasing and connecting the separate device to the existing product, the existing product may have the remote management service provided thereto.

The product 20 intended to have the remote management service from the server 10 may register a unique device ID of the product 20 to the server 10 for management by the server 10.

If an access is made from the home appliance 20 to the server 10, the server can identify the home appliance with the device ID. The server may have characteristic information (For an example, a kind of the product, model information, and so on) on the home appliance registered thereto together with the device ID. In this instance, though the device ID may be made without relation to the characteristic information on the product, such as the kind of the product, and the model information, the device ID may be encoded together with the characteristic information on the product. Accordingly, the server 10 may also be made to perceive the kind of the product or the model information on the product only with the device ID.

The user may have the remote management service for the home appliances 20 registered to the server 10 provided thereto upon request a service to the server 10 through the home appliances. For an example, if the user selects and inputs a desired service to a display window (Display unit) in a refrigerator 21, the refrigerator 21 can request the service to the server 10.

In the meantime, in many cases, the home appliances, such as the refrigerator, a cleaner, the oven, the air conditioner, and a water purifier, do not always position adjacent to the user. Therefore, a service request to the server through the home appliances 20 may not be easy. Moreover, in many cases, the home appliances may not have devices which can receive or display different pieces of information provided thereto. Accordingly, the service may be requested to the server through an external terminal 40 the user always carries, such as the smart phone. For this, an application may be installed to the external terminal 40 for embodying the service. Since the external terminal 40, such as the smart phone, has devices provided thereto for receiving or displaying the different information, the request for service can be made, very conveniently.

And, though it will be described later, remote management, remote control, monitoring, and diagnosis of the home appliances may be made through the application. Those functions are one example of the remote management service described before.

In this case, the external terminal 40 communicates with the server 10 directly, and the server 10 communicates with the home appliances 21 and 22. With this, the user can request the remote management service through the external terminal 40, and can also notice information on carrying out and finish of the service, easily.

However, in order to request, and carrying out, the service, it is required to specify relations among the user's external terminal 40, the home appliance 20 service for which is desired, and the server 10. That is, if the user accesses to the server 10 through the home appliance 20, though a service object can be specified to the server as the access is made through the ID of the home appliance at the time of the access, if the access is made not through the home appliance 20, it may be required to determine how to specify a service objective home appliance.

Figure 4:
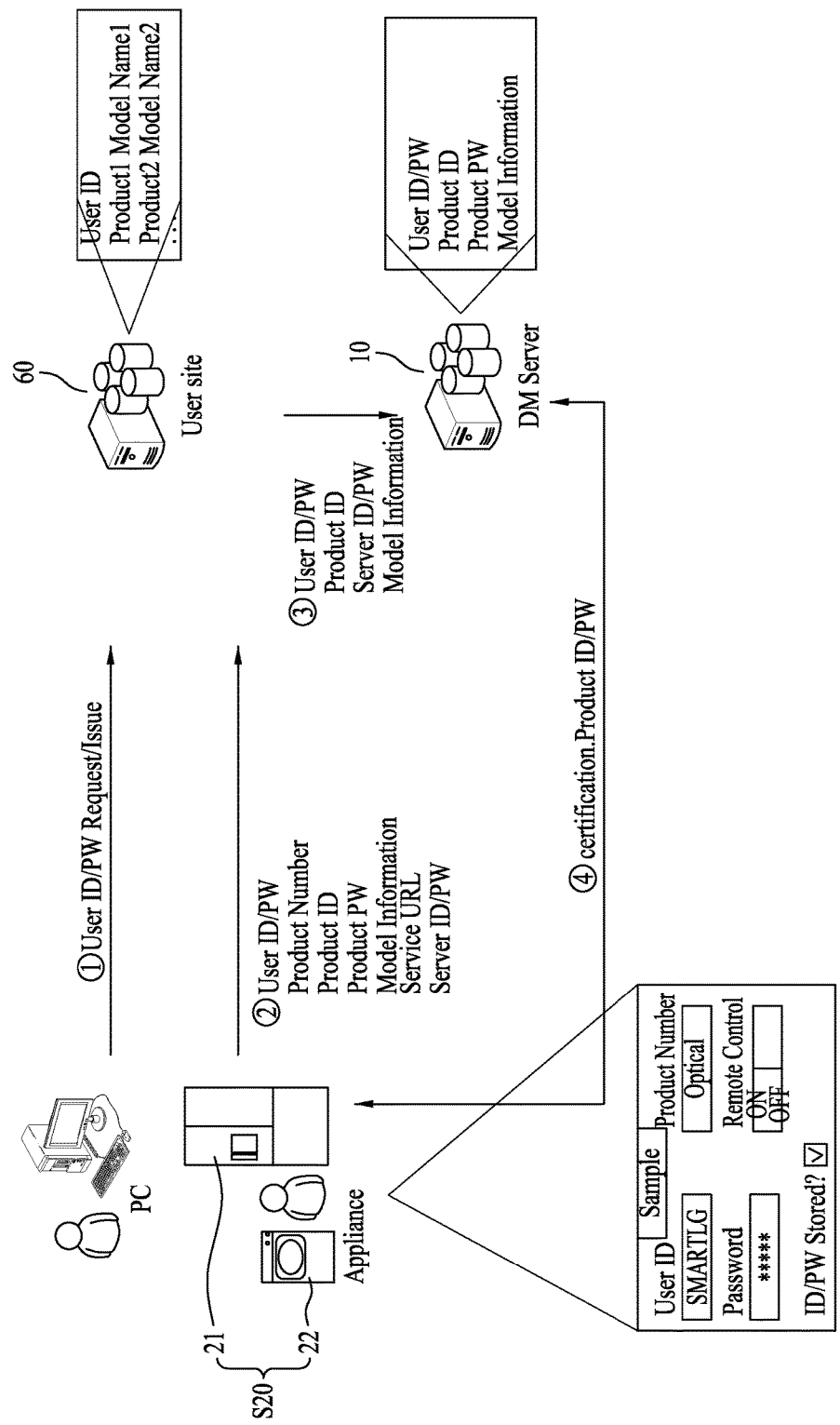
FIG. 4 illustrates a schematic view of an embodiment of a configuration and a procedure of signup and activation.

As an example, the user may access to the user site (See FIG. 4, inputs the device of the home appliance desired to have the service provide thereto, and requests the service. However, in this case, the user has inconvenience of recollecting entire device IDs of the home appliances the user has.

The user site may be made to resolve such inconvenience. The user may signup to the user site and have a user ID and a password given to the user. The user may log-in the user site and register all the home appliances the user owns thereto. The home appliances registered to the user site may be registered to the server together with the user ID. This may be done by automatic transmission of the user ID and the device IDs matched to the user ID from the user site to the server. With above steps, the server may have user information on the user, and home appliance information on the home appliances stored therein. Of course, the user information and the home appliance information is stored in the server matched to each other.

In the meantime, the user may signup to the user site with an application installed to the external terminal 40 to have the user ID and the password given to the user. Of course, the user may register entire home appliances the user has with this. The application may be provided for the remote management service of a particular home appliance, or may be provided for the remote management service of a plurality of the home appliances, detail of which will be described later.

Moreover, the registration of the home appliances 20 to the server 10 described before may also be made with an activation procedure to be described later.

In any case, if the user has the ID issued thereto, the ID may be registered to, and managed by, the server 10, together with the home appliance information of the user, i.e., unique information on products, such as the device IDs.

The service received from the user through the user site, the external terminal 40, or the home appliance 20 may be carried out as a manager gives an order to the server 10 on the management service. Or, by direct communication with the server through an open API of the server, the user site, the external terminal, or the home appliance 20 may make management request to the server, directly.

The server 10 has a server side protocol provided thereto for the management service, wherein the server side protocol carries out the management service request thus in interrelation with a server side protocol of the product.

As a protocol for carrying out the management service between the server 10 and the home appliance 20, an OMA DM (Open Mobile Alliance Device Management) protocol may be used. Therefore, if the OMA DM protocol is used, it may be said that the server side is a DM server, and the home appliance side is a DM client. Of course, not the OMA DM, but other solution may be used. Though the embodiment suggests using the OMA DM protocol, the present invention is not limited to this.

The management service may have the following management details.

Bootstrap: In order to carry out an initial management session, the DM client needs certification information from the DM server, and network setting information for connection to the network. A step for above is called as Bootstrap.

Provisioning: The home appliance which carries out the management session initially is registered to the DM server with the Bootstrap, and configuration of the home appliance is updated for providing, the service to the home appliance. A step for above is called as Provisioning.

Configuration Management: Management work for referring to, changing home appliance related setting information, or setting, referring to, or changing service related information is called as Device configuration management.

Control Management: Management work for controlling the home appliance is called as Control Management.

User Alert: By providing an alert signal to the DM client, the DM server may inform detail of the management work to the user, or Obtain permission from the user. That is, by interaction with the user, the server can provide improved management work.

Diagnostic and Monitoring: During the user uses the home appliance, the home appliance may cause poor performance or malfunction. The server is required to perceive, or able to perceive, such a state in advance, and provide a secure product use environment to the user by taking an action proper to the state perceived thus. Such work is called as diagnostic and monitoring.

Firmware Update Management: Management work carried out in a case a trouble, a functional change, or updating of firmware takes place at a home appliance after sold by a manufacturer.

Software Component Management: Management work carried out for installing, updating, or erasing a software component from the home appliance.

Backup and Restore Management: Management work carried out for backing-up/restoring data on the home appliance to the DM server.

In the meantime, the server 10 may be installed distributed to many places. For an example, a server 1 may be installed in Korea and a server 2 may be installed in the USA.

And, the server may be separated into a plurality of servers according to services of the servers. FIG. 2 illustrates a schematic view of an example of the server 10 separated into a DM server, a Notify server, a DL server, an ONM server, and a Legacy server. Thus, if the server is separated according to services of the servers, when a particular service is carried out, the DM server may prepare for, or carry out other service. Accordingly, a plurality of services may be processed at a time.

In carrying out services, the servers may access to respective service objects to carry out respective services, directly.

Some of the servers may be made be able to access to service objective home appliances, directly. For an example, the notify server can transmit a notice to the service objective home appliance directly, and the DL server can transmit upgraded firmware to the service objective home appliance, directly.

The server 10 may have a configuration varied with detail of the management service. For an example, if the detail of the management service is the firmware update only, since the service can be made by the DM server, the notify server, and the DL server, the other servers may not be necessary. And, if it is arranged that the service is carried out without a notification procedure on the firmware update to the user, the notify server may not be necessary.

Though the embodiment suggests a configuration of the server as shown in FIG. 2 as an example, taking the firmware update, the software (Inclusive of different contents) management, the home appliance diagnosis, the home appliance monitoring, refrigerator expiry date notification, refrigerator food list provision, washing course upgrade into account, the present invention is not limited to the configuration of the server as shown in FIG. 2.

A configuration and a communication environment of each of online systems will be described in more detail. All of the following details may not be essential ones to be provided without fail. And, there may be configurations added to the following contents by description made on other portions of the specification.

(1) The Server may have the following configuration.

1) DM Server

The DM Server provides a service of giving a management order to the DM client. That is, by means of the management order, the DM Server provides a management function of processing firmware update (Modem firmware/OS) management work, software management work, diagnostic management work, and so on, remotely. The DM Server may include a Session Management region, a Security Management region, a DM Protocol Process region, and a SyncML Protocol Engine region.

2) DL Server

The DL server transmits a file to the DL client. That is, the DL server provides a function in which the DL server transmits information on the file intended to transmit through a DD (Download Descriptor), for the DL client to download the file, exactly. In this instance, the DL client is the home appliance which downloads the file. In the files downloaded thus, there are a firmware update package and a software management package. The DL server may include a Session Management region, a Package Management region, and a Download region.

3) ONM Server or User Portal

The ONM Server provides a service of interfacing with the DM or DL and the Legacy servers, and embodying a business logic. The manager may give a management order, or refer to management information, through a management web page of the ONM Server.

The User Portal provides some of the functions of the ONM Server to the user. In this instance, the functions of the ONM Server are embodied through the open API of the DM Server. The user may request the management service to the DM Server through the user portal.

4) Legacy Server

Representative Legacy Servers the ONM Server is operated interrelated thereto are a server having terminal information transmitted thereto and a server having user information transmitted thereto. That is, the legacy server transmits the user information or the home appliance information to the ONM Server for providing information to embody the business logic.

5) Notification Server

The notification server transmits a notification message from the DM server to the borne appliance. The notification server may include a Session Generation region, and a Schedule Management region.

If the home appliance is in a private network, in order to maintain connection to the home appliance, a Connection Manager may be required specially provided to a server side. The home appliance may request a TCP connection after booted automatically, and the connection manager maintains the TCP connection requested thus. The DM Server transmits the notification message through this.

6) Open API

An application at a mobile communication terminal, such as a smart phone, may manage the home appliances through the open API provided by the DM Server, remotely. The Open API will be described, later.

(2) The home appliance may include the following configuration.

1) Communication Module

The home appliance has the communication module mounted thereto. Kinds of the communication module are not limited. The communication module may be a wired communication module or a wireless communication module.

As an example, the communication module may be a communication module from which WiFi is available, or communication module from which PLC communication or Zigbee available.

2) DM Client

The DM client provides a main service of carrying out the management order from the DM Server. That is, in response to the management order from the DM Server, the DM client provides the management functions of processing the firmware update management work, the software management work, the diagnosis management work, and the control management work, remotely.

Figure 3:
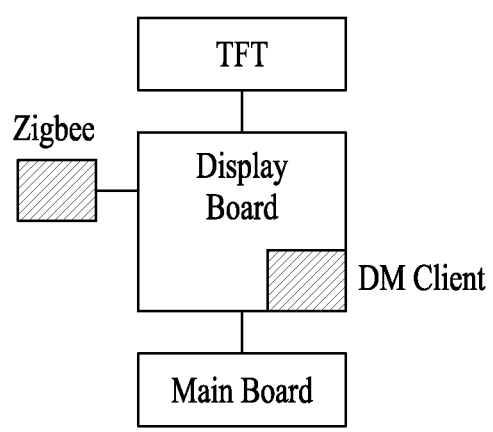
FIG. 3 illustrates a block diagram showing a mode of an embodiment in which a DM client is mounted to a display hoard of a home appliance.

FIG. 3 illustrates a block diagram showing an example in which the DM client is mounted to the home appliance. In a case of the home appliance having a TFT display provided thereto, the DM client may be mounted to a circuit board (Display board) of the TFT. The main board in FIG. 3 is a circuit board for carrying out an original function of the home appliance. For an example, in general, the washing machine may have a main controller provided to a main board for controlling a water supply valve, and a motor connected to a drum for carrying out washing.

Though the DM client may be mounted to the main board of the home appliance, it is favorable that the DM client is mounted to a display board because a display window may be used more frequently for requesting the management service.

3) DL Client

The DL client provides main service of downloading a package file (Firmware update package. Software management package, and so on) from the DL server. The DL client receives a download server URL from the DM client, accesses to a download server, takes a DD (Download Descriptor) from the download server, and carries out the download.

4) Agent

The agent provides a service of carrying out a management service order requested from the home appliance according to detail of the management service. For an example, an update agent provides a service of producing new firmware by using an update package downloaded for firmware updating. The update agent may be embodied in a variety of modes by manufacturers.

5) Bootstrap

The home appliance may include bootstrap information, which will be described in detail in a bootstrap procedure to be described, later.

6) Daemon

The Daemon may provide a service of processing the home appliance making periodic access to the server. It is preferable that the Daemon always maintains a turn on state as far as the home appliance does not have a power cord unplugged therefrom. For an example, even if power to the washing machine is in a turn off state, as far as the power cord of the washing machine is connected to a socket thereof, the Daemon can always maintain the turn on state. If it is necessary to turn on the power to the washing machine by request from the server, the Daemon can transmit an order to the main board to turn on the power.

7) UI (User Interface)

There may be a case permission from the user is required for carrying out the management service, and a case the user requests the management service through the home appliance. As the user interface, a TFT LCD window of the home appliance may be used. Especially, the user interface may be provided to a touch LCD or an LCD display. A display screen may be provided to have a frame of the management service popped-up thereon. Such a management service frame may be provided to input the user ID and the password thereto. In this instance, the user ID and the password may be the user ID and the password given at the time of signup to the user site. A server system can identify the user with the user ID and the password. At the time a service is requested through a terminal, the terminal may transmit the user ID and the password, the device ID, and service requesting information to the server.

However, the user interface is not provided to all the home appliances. This is because embodying interface for the management service in addition to the user interface required for carrying out an original function of the home appliance may require large expense and space.

For an example, embodying character or the like input means, or a display unit for displaying a large amount of information, may not be easy for the home appliance, such as the laundry machine, the air conditioner, the cleaner, the oven, and so on.

Therefore, in order to carry out the management service of the home appliance, an external terminal, such as the smart phone, may be required. This is because the external terminal, such as the smart phone, has the communication module, a memory, OS, the input means, and display unit for itself. Recently, the external terminal with the touch LCD or LED has come into wide use. Therefore, a limitation on the user interface the home appliance has may be supplemented or extended by the external terminal. A detailed example will be described, later.

(3) A communication environment between the home appliances and the server will be described.

Basically, as far as suitable for carrying out the management service, kinds of the communication environment do not matter.

FIG. 2 illustrates a schematic showing an example in which the home appliance having a wireless Internet communication module applied thereto communicates with the server 10 through an AP (Access Point) and the Internet network.

Upon reviewing a communication path starting from the home appliance 20 to the server 10, the communication path after the AP is a public Internet network, and the communication path before the AP is a private Internet network. The home appliances 21 and 22 are given private IPs from the AP 30 respectively, and the AP 30 itself has a unique IP.

The server 10 also has an IP, which may be a unique IP. Therefore, it is preferable that the communication module of the home appliance, for an example, a WiFi communication module, has the unique IP of the server. The home appliance may access to the IP of the server through the Bootstrap described before to make communication between the two.

Then, in order to make the server 10 to know a position of the home appliance 20 for the server 10 to track the position of the home appliance 20, the DM client may keep providing signal to the DM Server. The AP 30 transmits port information the home appliance is connected thereto and the unique IP information of the AP 30 itself to the DM Server, by using the information, the DM Server becomes to know the position of the DM client. Of course, it may be viable that the home appliance may also transmit information on the AP 30, and the port information connected to the AP 30 to the server 10 through the AP. Accordingly, if the home appliance 20 transmits the device ID information together with above information to the server, the server system becomes to know which home appliance is at which position, and can access to the home appliance by using the information. In this instance, the user ID and the password may also be transmitted together with above information.

Eventually, the server 10 becomes to know the position of a particular home appliance 20 of a particular user. Therefore, if a particular management service is requested to the server through the home appliance or the external terminal of the user, the server can determine the particular home appliance and carry out the particular management service, easily.

(4) Admin Portal

Though the Admin Portal is not positively required, the Admin Portal enables the manager to carry out the management work, effectively. For an example, in a case of the firmware update, a manager who updates and registers the firmware and a manager who inspects the firmware update file registered thus may cooperate with each other through the Admin Portal. The Admin Portal may include a Firmware Upgrade Process region, a Software Upgrade Process region, a Device Management region, a System Admin region, and a Statistics region.

Detail and procedure of the management service will be described.

(1) Signup and the Home Appliance Activation.

FIG. 4 illustrates a schematic view of the signup and activation.

As described before, if the user accesses to, and signs up the user site 60, the user may be given the user ID and the password.

The Home Appliance Activation may be a procedure for registering the user's appliance to the server 10. A display screen of the home appliance may have a window which enables the user to input the user ID, the password, and so on pops up. The user may carry out the activation procedure through the window. When the user inputs the user ID, and the password to the window, and inputs an activation order, the home appliance transmits the user ID, the password, the device ID, and the characteristic information of the home appliance to the user site 60. In this instance, the home appliance 20 may have the user ID, and the password inputted thus stored therein. According to this, the user ID, and the password may be used for certification of the user.

The device ID may have been inputted to the home appliance already, or is generated within the home appliance automatically when the activation procedure is carried out. Or, it is possible to make the home appliance to generate the device ID automatically when the home appliance is newly bought and turned on for the first time.

As the characteristic information on the home appliance, there may be model information, a product code, a manufactured date, a manufactured product number, and so on of the home appliance.

And, in the activation procedure, the home appliance may transmit the password of the home appliance, a service URL, a server ID and password. Of the information transmitted to the user site 60 in the activation procedure, the information excluding the user ID, and the password may be generated at the home appliance 20 automatically, or in an already inputted state inputted.

In the activation procedure, the information described before may be received at the user site 60 from the home appliance 20. The user site registers the home appliance at the user ID. According to this, the user site may have the home appliances 20 the user uses registered at each user ID.

Then, the user site 60 transmits the user ID, the password, the device ID, the characteristic information on the home appliance to the server 10. In this instance, the ID and the password of the server may be transmitted, altogether.

The server 10 carries out certification on the information transmitted thus at first. Accordingly, when the certification is passed, the user ID, the password, the device ID, and the characteristic information of the product are registered to the server. In this instance, the device password may also be transmitted, altogether.

The activation procedure may be made regardless of place if a state of a communication environment is provided, in which access to the server and the user site is possible. For an example, a seller from whom you have bought a product may carry out the activation procedure for you.

(2) User's Service Request

The user may request the service at a display screen of the home appliance intended to have the service provided thereto. For an example, after making a frame of the desired service to pop up on the display screen of the home appliance 20, the service request may be made after inputting the user ID and the password. In this instance, the home appliance may transmit the user ID, and the password, together with information on the service request.

Moreover, the user may request the desired service through the user site 60, too. The user site may have a web page provided thereto for the user to request the management service thereto, and the user may also request the desired management service at the web page. Upon reception of the service request front the user, the user site may transmit information on the service request to the server system. In this instance, the user ID, the password, and the device ID may be transmitted, altogether.

Moreover, the user may call a client call center to make the service request. The client call center may be made to receive the management service with an ARS system.

Figure 5:
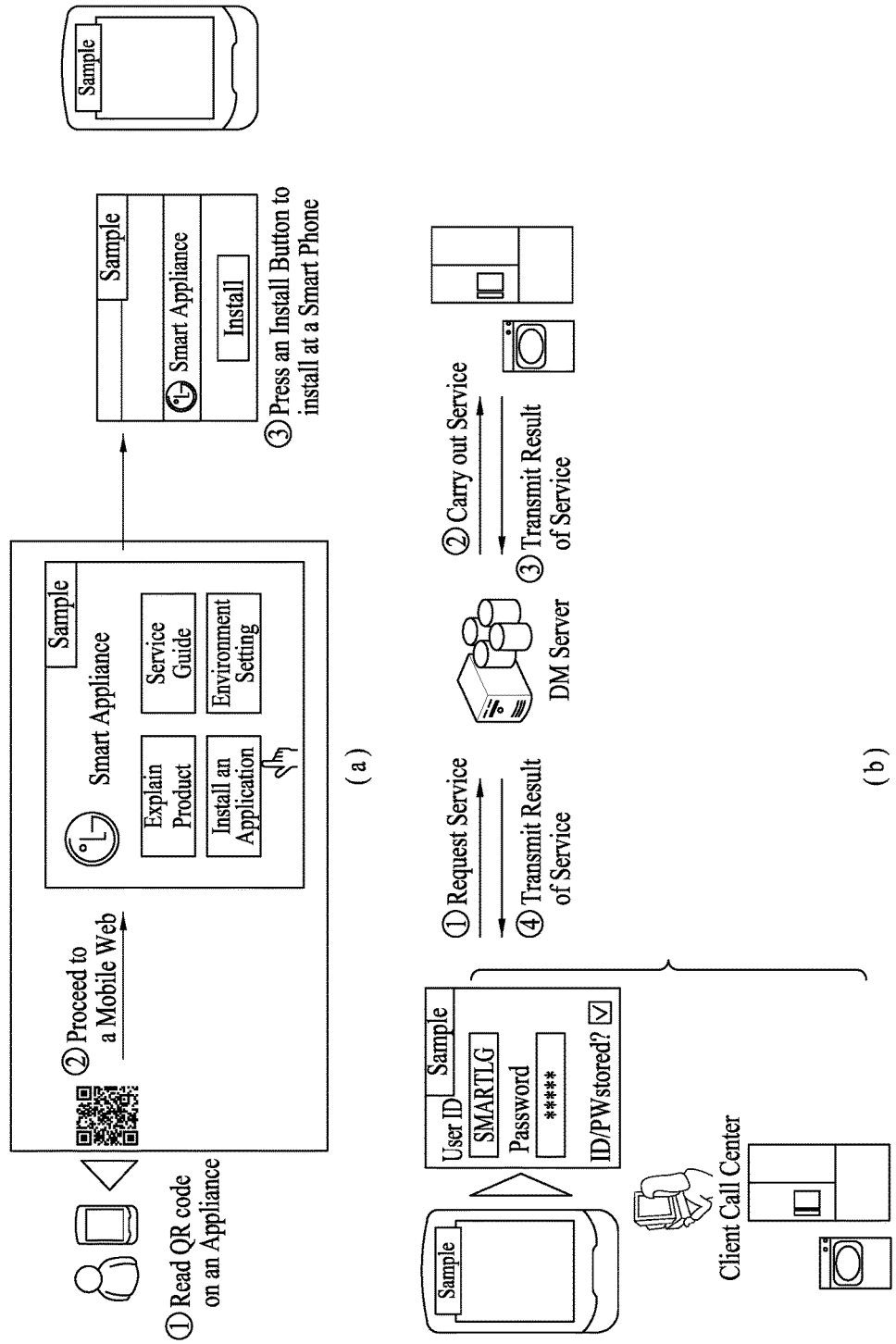
FIG. 5 illustrates a schematic view of an embodiment of a procedure of downloading an application from an external terminal, and a configuration and a procedure for a user to request a management service.

In the meantime, the service request may be made through the mobile communication terminal (The external terminal), such as the smart phone. FIG. 5A illustrates a block diagram showing an example in which a smart phone application is downloaded for having the management service. FIG. 5B illustrates a diagram showing an example in which the service request is made through the smart phone, the client call center, or the home appliance.

In a case the service request is made through the smart phone, after putting the management service application installed at the smart phone into operation, the user may input the user ID, and the password, and then, may request the service. The smart phone may transmit information on the service request to the server system for resting the service, together with the user ID, the password, and the device ID.

Upon requesting the remote management service for the home appliance to the DM Server with different methods describe above, the DM Server carries out the remote management service for the home appliance. Upon finishing the remote management service, the home appliance informs finishing of the service to the DM Server. In a case the service request is made not from the home appliance, but from the external terminal or the like, the DM Server informs finishing of the service to the external terminal.

Accordingly, the user can request the remote management service of the home appliance and notice a result of the request through the external terminal directly, without passing through the home appliance.

(3) Firmware Update

The Firmware Update is a service provided by a manufacturer for updating an error taken place in product development or a firmware improvement. The Firmware Update may be generated by an update package generator of the manufacturer, and the update package generated thus is transmitted to relevant products through the DM/DL clients.

The update package transmitted to the product thus may be stored at a reserved address of a designated flash memory, and, in this instance, a size of the update package may be limited by the manufacturer or the enterpriser.

Figure 6:
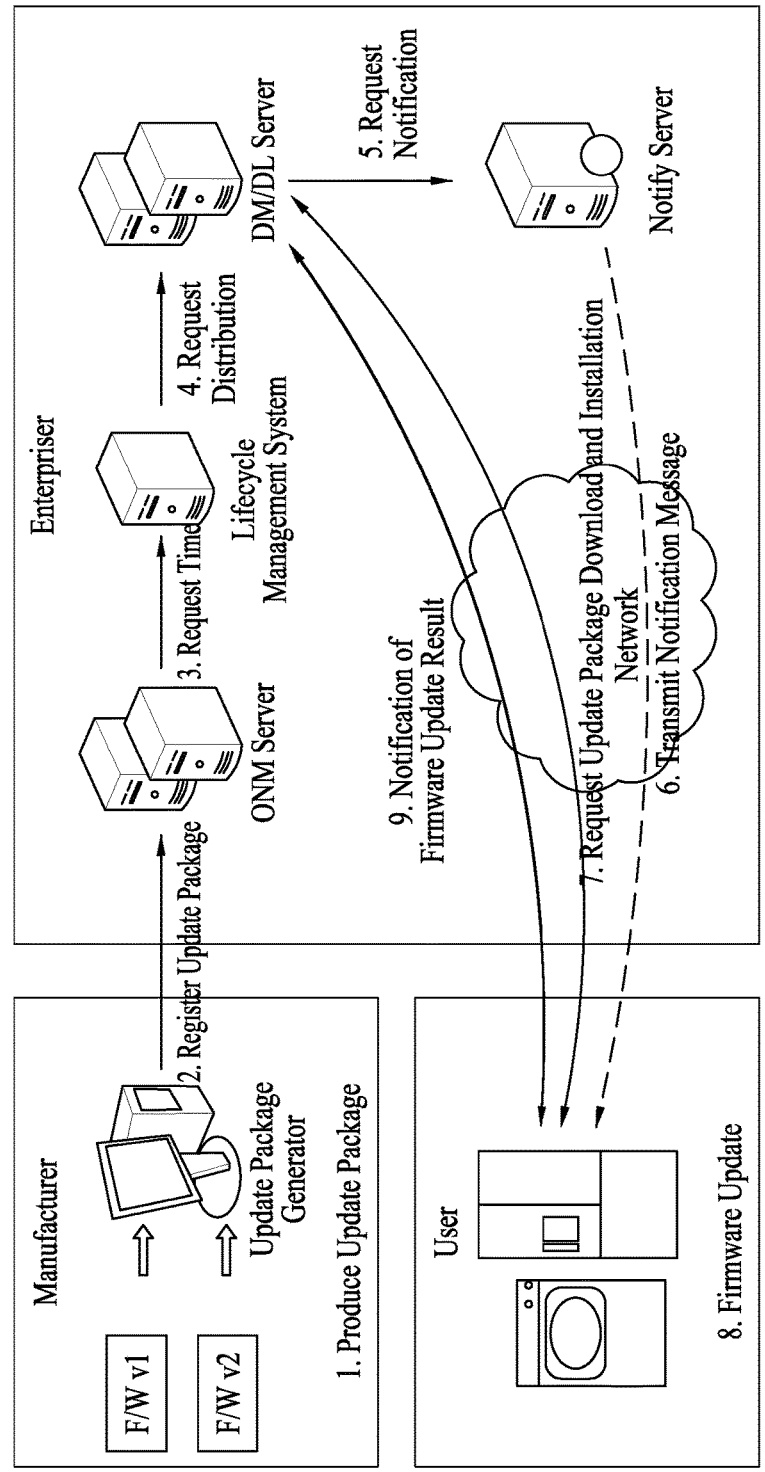
FIG. 6 illustrates a schematic view of an embodiment of a configuration and a procedure on firmware or software upgrade.

FIG. 6 illustrates a diagram showing a service procedure for updating the firmware update package. The procedure will be described with reference to FIG. 6.

1. Generate Update Package: If a matter to change the firmware takes place, the manufacturer generates new firmware. An update package is generated, which has a difference between the new firmware and the firmware of the present version written thereon.

2. Register Update Package: The manufacturer register the Update Package generated thus to a system of the enterpriser.

3. Request for Test: The Update Package registered thus is subjected to a test procedure of the manufacturer before transmission to the home appliance.

4. Request for Distribution: The Update Package passed through the testis registered to the DL server for distribution to the home appliances.

5. Request for Notification: The DM Server request transmission of a notification message for carrying out registered work.

6. Transmission of the Notification Message: The notification message is transmitted to the home appliance.

7. Request for Downloading, and Installation of the Update Package: The home appliance having the Update Package downloaded thereon is re-started. (Depending on cases, the update may be made before the re-start).

8. Firmware Update: Update of the home appliance is carried out by using UA.

9. Notification of a Result of the Firmware Update: The home appliance notifies the DM server of a result of the Firmware Update.

The DM client of the home appliance is interrelated to the DM Server by using the OMA DM protocol, and the Firmware Update is made by the DM client and an FUMO Agent in interrelation to each other.

Starting main bodies of the firmware update procedure are the DM Server and the user, and a DM session triode can support both Background/Foreground.

In a case the DM Server starts the firmware update procedure, upon receiving a notification message from the DM Server, the DM client can start. In this instance, downloading and updating may be carried out at a time. That is, right after downloading the update package, update running (FUMO Node: DownloadAndUpdate) may be carried out through the UA.

In a case the user starts firmware update procedure, the user can input to carry out the update running (FUMO Node: DownloadAndUpdate) through a menu item on a display screen of the home appliance.

(4) Software Management

The software management is management work of addition, updating, and erasure of software. User software may be installed at a file system region (including internal/external memory) of the terminal.

Figure 7:
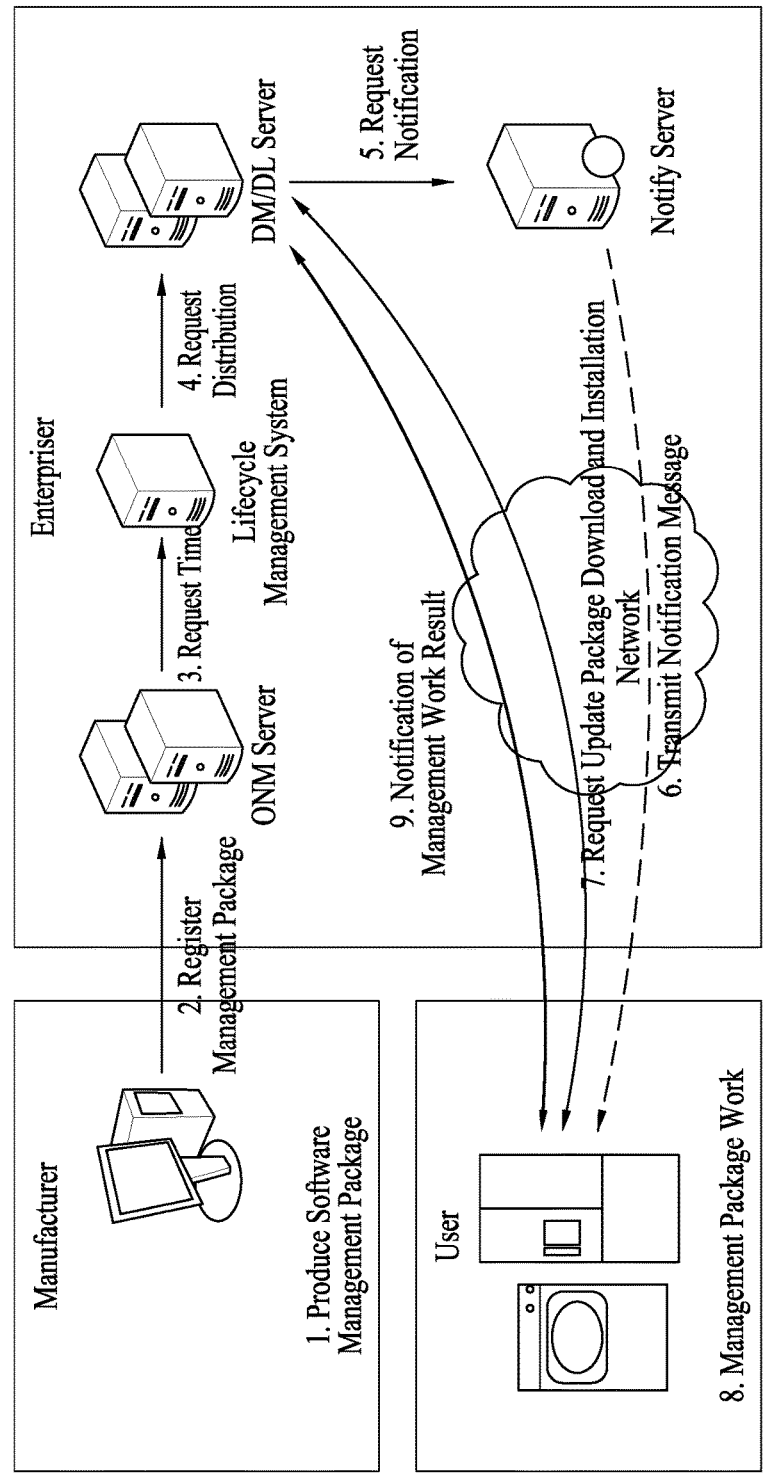
FIG. 7 illustrates a schematic view of an embodiment of a configuration and a procedure on software management service.

FIG. 7 illustrates a diagram showing a procedure for software management by using which a Push type service is available. The procedure shown in FIG. 7 will be described.

1. Software Management Package Generation: A software manufacturer develops software and generates a management (Distribution) package in conformity with a relevant OS.

2. Management Package Registration: The software manufacturer registers the management package generated thus to the server.

3. Test Request: The management package generated thus is tested.

4. Distribution Request: Distribution of the management package having finished the test thus is requested.

5. Notification Request: The DM server request transmission of a notification message for carrying out registered work.

6. Notification Message Transmission: The notification message is transmitted to the terminal.

7. Request for Management Package Download and Installation: The DM Server makes management package download and installation request to the DM or DL client.

8. Management Package Work: Installation of the management package downloaded thus is requested to an Installer of a relevant OS at a desired option by an SCoMO Agent, and the relevant OS Installer installs/updates the management package at the user file system region.

9. Management Work Result Notification: The DM client at the terminal notifies the DM Server of a result of the management work.

The DM client at the terminal and the DM Server are interrelated to each other by the OMA DM protocol, and the DM client at the terminal manages the software in interrelation with the SCoMO Agent to each other.

A starting main body of the software management procedure may be the DM Server, and the DM session mode can support both Backgroun/Foregroun. By receiving a Notification Message from the DM Server, the terminal may make the DM client to start. In this instance too, both the download and the update may be carried out at a time. That is, right after downloading the management package file, the management work (SCoMO Node: DownloadInstallInactive or DownloadInstall) is made to be carried out through the SCoMO Agent.

(5) Home Appliance Control Management (Product Control)

A product can be controlled, remotely. The control management may be started by the DM Server, and may be operated in a Background. Therefore, interaction with the user through an MMI and occurrence of an interrupt may not be taken into account.

In a case of the refrigerator, a refrigerating chamber temperature, a freezing chamber temperature, a convertible room temperature or mode (Frozen food mode, Meat mode, Vegetable mode and so on). Express freezing (Including turning on/off), refrigerating chamber operation mode control (General mode, Test mode, LQC mode, display mode, smart diagnosis mode, and so on), and dispenser control (Fragmented ice mode, water mode, cubic ice mode, and so on) may be control items.

In a case of the washing machine, power turn on/off, putting into operation, operation turn off and so on may be control items. Along with this, a scheduled operation change, and a washing course detailed option change may also be the control items. Moreover, controlling the crumple preventive function to be carried out after finishing the washing course is also possible. Such control management may be made through the DM Server via the open API by using a smart phone application.

Figure 8:
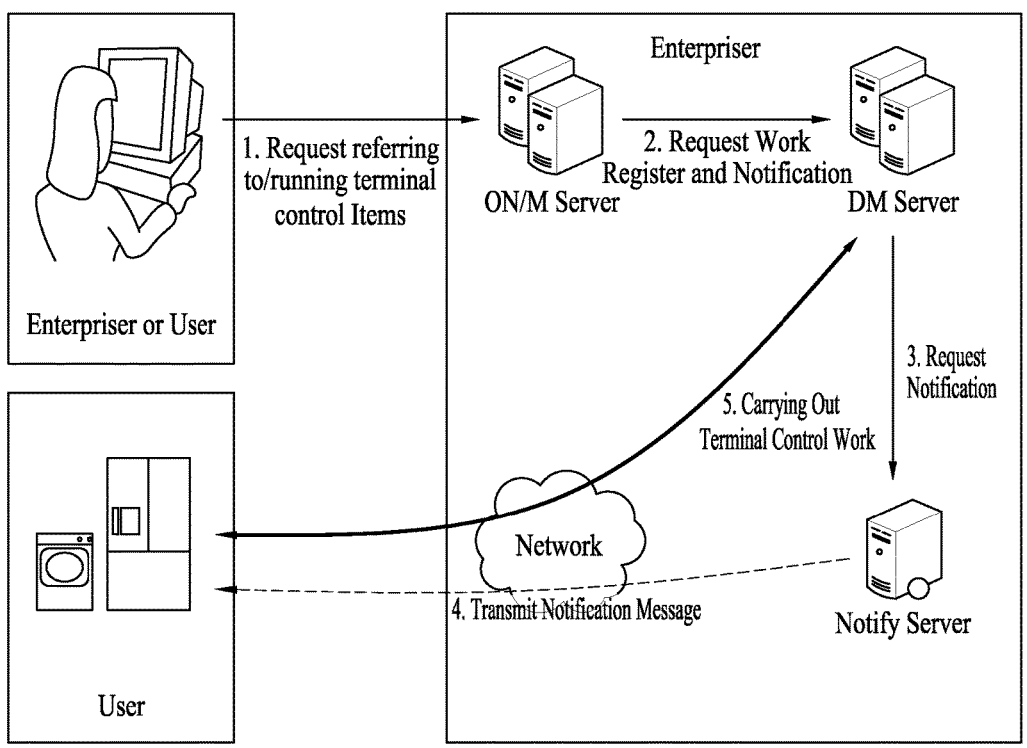
FIG. 8 illustrates a schematic view of an embodiment of a configuration and a procedure on remote control service.

FIG. 8 illustrates a diagram showing a control management procedure, which will be described in detail.

1. Referring to control items/Request for Running: The manager (Or the user) requests work of the referring to control items/request for running to the ONM server by using a management frame on the ONM server.

2. Work Registration and Notification Request: The ONM server requests the control/operation work and notification of the same to the home appliance by means of a Notification message to the DM Server.

3. Notification Request: The DM Server requests the Notify server to notify a product.

4. Notification Message Transmission: The notify server transmits a notification message to the home appliance.

5. Carrying out Control Work: The home appliance receives the notification message from the DM Server, accesses to the DM Server, and carries out the control work.

The DM client at the home appliance interrelates to the DM Server by using the OMA DM protocol to each other, and the control is managed by the DM client at the home appliance and the control Agent in interrelation with each other.

A start main body of the control management may be the DM Server, and the DM session mode may be a Background. The DM Client starts the control management upon reception of the Notification Message from the DM Server.

(6) Diagnosis

The diagnosis is a service for diagnosing the home appliance. For an example, when it appears that the washing machine has a problem of having gone wrong, the user may request the diagnosis service. Upon reception of a diagnosis order, the washing machine puts a diagnosis program into operation to collect data required for the diagnosis.

The home appliance may collect event data or log data during normal operation. The data may be utilized as the diagnosis data. That is, collection of the diagnosis data can be made even if there is no diagnosis request. For an example, if an event takes place, in which the drum of the washing machine does not rotate, such an event data may be recorded and conserved. According to this, if there is the diagnosis request, the washing machine may drive the diagnosis program together with the data collected and recorded thus and may transmit a result of the drive to the server system, together with the collected data.

In a case of the washing machine, the diagnosis data may include a motor net acting ratio, a power data loaded on the washing machine, a tub or drum inside temperature data, a data on operation of a water supply valve, a data on operation of a drain valve, and so on.

And, in a case of the refrigerator, the diagnosis data may include a data on operation of a cooling fan, a refrigerating chamber or freezing chamber temperature data, a data on operation of a compressor, a data on operation of different valves, such as an expansion valve, a data on operation of an ice maker, and so on.

Along with this, the diagnosis data may include a data on operation of the display unit or the input unit which fall under the user interface, and a data on operation of a water level sensor (In a case of the washing machine), and different temperature sensors (For an example, a sensor for sensing a tub inside temperature of the washing machine, and a temperature sensor in the refrigerating chamber or the freezing chamber of the refrigerator).

The diagnosis data may include information on an order run time period, and a data produced time. The diagnosis data may be transmitted to the server, and the server may start an analysis program to provide a result of diagnosis.

The diagnosis request may be made through the smart phone, or access from the client center to the server system upon user's request to the client center. And, if an error takes place at the home appliance, as the error information is transmitted to the server, the diagnosis (nay be made.

The open API interface for the diagnosis may be designed to provide a start interface only. According to this, interruption after starting the diagnosis may not be provided.

Figure 9:
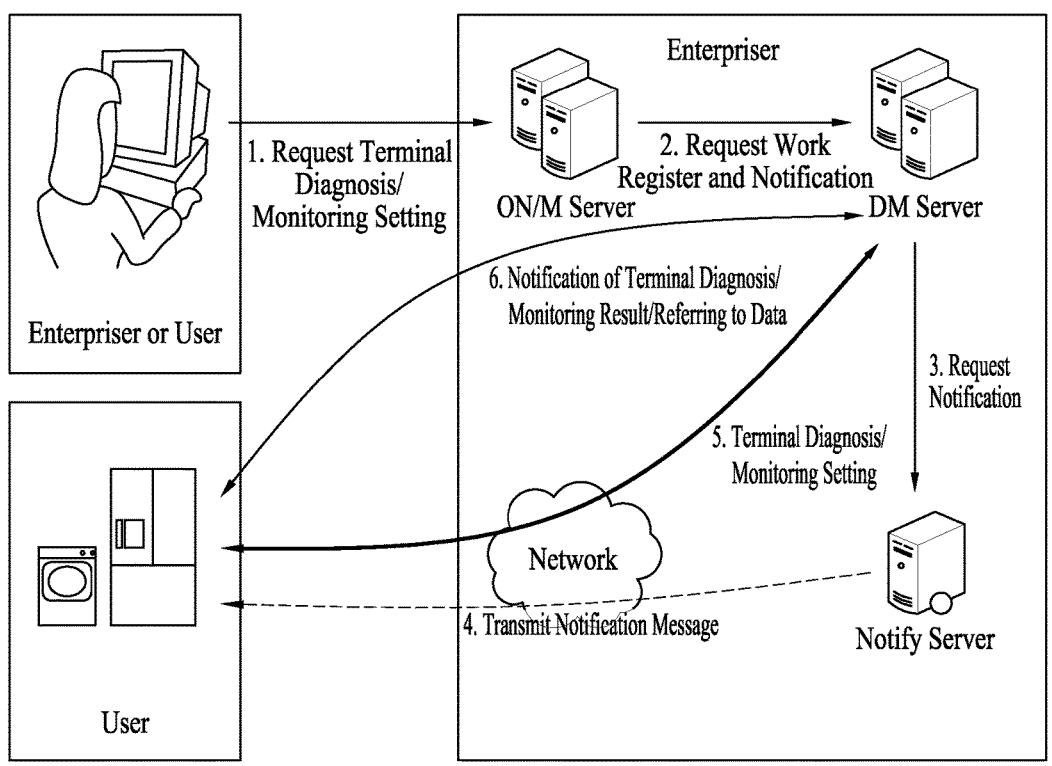
FIG. 9 illustrates a schematic view of an embodiment of a configuration and a procedure on diagnosing or monitoring management service.

FIG. 9 illustrates a diagram showing a procedure for the diagnosis, which will be described as follows. Since the diagnosis procedure may be the same with a monitoring procedure to be described later, the monitoring procedure is shown in FIG. 9, altogether.

1. Diagnosis/Monitoring Setting Request: The manager (Or the user) requests conditions and starting of running of the diagnosis/monitoring by using a management frame at the diagnosis server.

2. Work Registration and Notification Request: The management server requests the DM server to request the condition and the starting of running and requests notification of the same for making the diagnosis/monitoring.

3. Notification Request: The DM Server requests the Notify server to notify the terminal.

4. Notification Message Transmission: The Notify Server transmits the notification message to the terminal.

5. Diagnosis/Monitoring Setting: The DM Server requests the conditions and the starting of running for making diagnosis/monitoring to the DM client.

6. Diagnosis/Monitoring Result Notification/Referring to Data: Upon finishing diagnosis/monitoring, the DM client (DiagMonAgent) at the terminal notifies (Alert message) the DM server of a result of the diagnosis/monitoring.

The starting main body of the diagnosis/monitoring management may be the DM server or the user, the DM session mode may be a Background.

If the DM server is the starting main body, the DM client starts the diagnosis/monitoring upon reception of the Notification Message from the DM server. And, if the user is the starting main body, the user starts the diagnosis/monitoring on the frame of the home appliance, and the home appliance runs the DM client after finishing the diagnosis/monitoring.

In the meantime, another mode of embodiment for carrying out the diagnosis will be described. The embodiment is related to user's transmission of operation sound or diagnosis sound to the server. For an example, the user may transmit the operation sound generated when the home appliance is in operation or the diagnosis sound for diagnosing the home appliance to the server system through the mobile communication terminal. The server system analyzes the operation sound or the diagnosis sound to diagnose the home appliance. The user may embody the transmission of the operation sound or the diagnosis sound to the server system in a variety of methods. For an example, when the user makes telephone call to the service center, and transmits the operation sound or the diagnosis sound of the home appliance through a receiver of the mobile communication terminal, the service center may transmit the operation sound or the diagnosis sound to the server.

The service center may be provided with an ARS system for automatic transmission of the operation sound or the diagnosis sound. The user may use a mobile communication terminal (For an example, the smart phone) having a diagnosis program installed thereto. That is, it may be possible to transmit the diagnosis sound to the server by using a diagnosis program installed to the mobile communication terminal. In this instance, the diagnosis sound may be transmitted to the server directly, or the user site may transmit the diagnosis sound to the server upon reception of the diagnosis sound from the user.

The server system may have a program for carrying out analysis and diagnosing the operation sound. The program may analyze the diagnosis sound data to convert the data into an error code or state information. The server system may transmit a result of such diagnosis to the mobile communication terminal of the user or the home appliance.

(7) Monitoring

Monitoring is a service related to monitoring of the home appliance. Upon reception of monitoring request, the home appliance may transmit a monitoring data to the server system.

For an example, upon requesting the washing machine for the monitoring data, the washing machine runs the monitoring program to collect the monitoring data, and transmits the same to the server. In this instance, the monitoring data may include information on a monitoring order run time period, and a monitoring data produced time period. And, it may be made that, if there is the monitoring run request, the monitoring, data is transmitted repeatedly once the monitoring is started.

In a case of the refrigerator, whether the refrigerator is in the express freezing state or not, a Hygiene state (For an example, whether the hygiene state is turned on or off), refrigerator operation mode, a dispenser state, an error state, a door open/closure state may be included to monitoring items. In a case of the washing machine, an operation state, a remaining time period of a course under operation, an initial set time period, a kind of washing course, a rinsing level, a spinning RPM, a set temperature for carrying out the course, and a scheduled operation time period may be included to the monitoring items.

The monitoring service may be requested through the smart phone, and referring to a result of the request may be possible.

The open API interface for monitoring may be designed to provide both starting and finishing interfaces.

The monitoring procedure may be as shown in FIG. 9.

Thus, an embodiment of a home appliance and an online system including the same which can embody the present invention have been described with reference to FIGS. 2 to 9.

Figure 10:
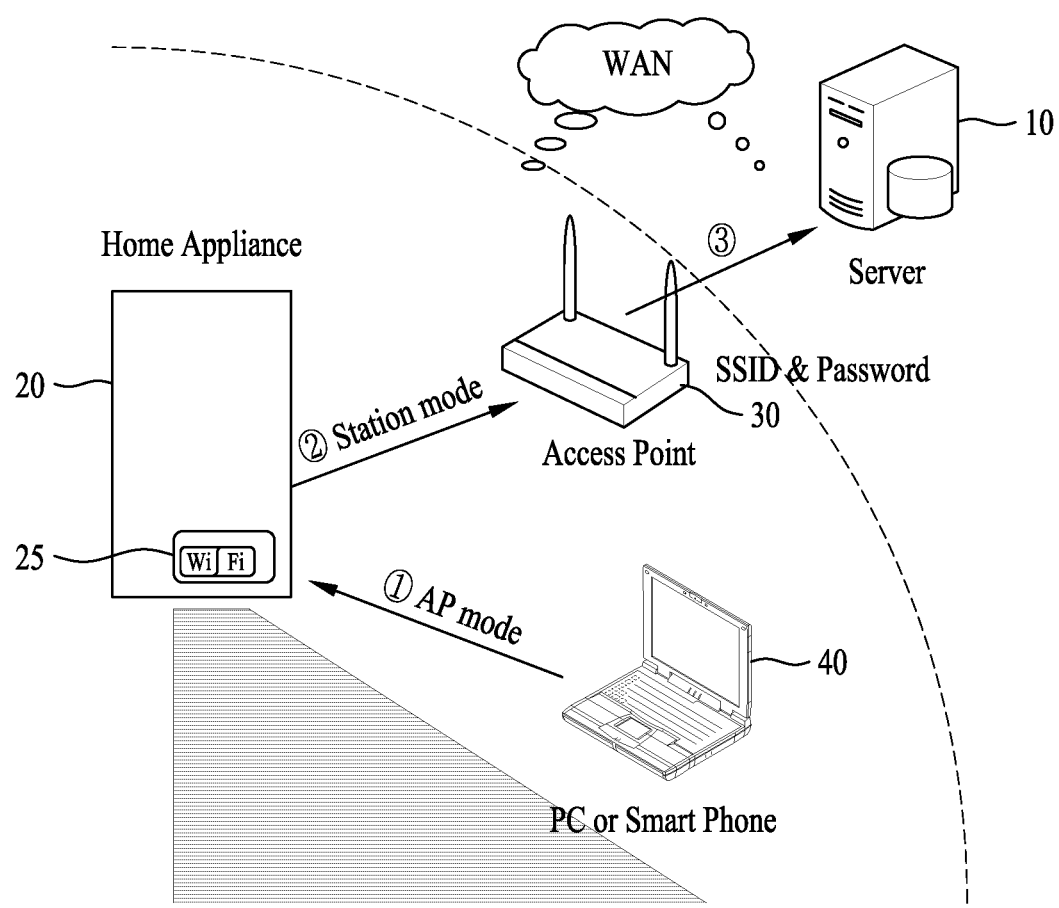
FIG. 10 illustrates a schematic view of an embodiment of a configuration and a procedure on communication connection of a home appliance.

A home appliance communication connection method and a configuration for this will be described with reference to FIGS. 1 and 10, in detail.

The home appliance 20 is required to communicate with the server 10, ultimately. For this, the home appliance 20 is required to communicate with an AP 30 in a home at first. Therefore, the home appliance 20 is required to have the communication module mounted or connected thereto. In detail, the communication module may be a WiFi communication module 25.

At first, power is applied to the home appliance 20 through a power selection unit 140 at the control panel 100 of the home appliance 20. In this instance, the power is applied to the WiFi communication module 25, too.

Figure 1:
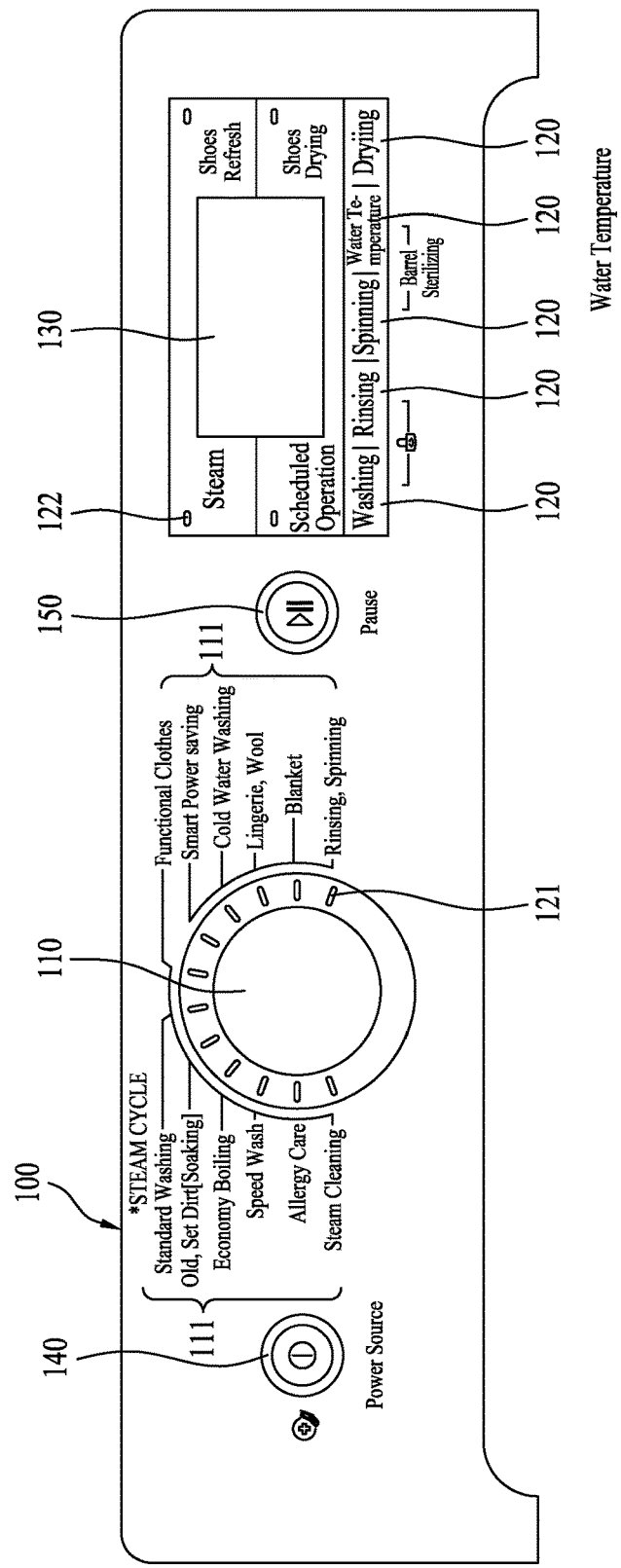
FIG. 1 illustrates a schematic view of a control panel of a laundry machine which is an example of a home appliance.

Referring to FIG. 1, many of the home appliances have no interface for receiving a character, or no display unit for displaying a variety of modes of frames provided thereon. Therefore, it is not easy to make the home appliance 20 to be able to communicate with the AP 30. For communication connection of such a home appliance, it is preferable that the WiFi communication module 25 is made to support a setting mode for the communication connection and a use triode which enables communication. In order to make the WiFi communication module 25 to be in the communication connection, the WiFi communication module 25 is required to carry out the setting mode, and if the WiFi communication module 25 is communication connected in the setting mode, the WiFi communication module 25 is changed to the use mode. Therefore, for making the communication connection, at first, the setting mode of the WiFi communication module 25 is put into operation.

In this instance, the setting mode is a mode in which communication with the AP is possible. Therefore, the setting mode may be called as an AP mode. And, the use mode is a state in which the home appliance can communicate with the server through the AP, enabling transmission/reception of information for carrying out the remote management service whenever required. That is, the use mode is a standby state for carrying out the remote management service. Accordingly, the use mode may be called as a connection mode or a standby mode.

For running the setting mode, input means may be provided to the WiFi communication module 25. However, in many cases, the WiFi communication module 25 will be mounted to an inside of the home appliance 20. Therefore, the input means may be provided to the home appliance.

However, referring to FIG. 1, it is not easy to provide the input means to the control panel 100 only for such a function. This is because provision of input means only for selection a particular function may not be required for mass production. And, this is because the carrying out the remote management service through the communication connection may not be an original function of the home appliance, but an additional function of the home appliance, i.e., an option which may be added if necessary. Therefore, it is preferable that the setting mode is operated by user's selection of a particular input unit among input means provided, already.

For an example, the control panel 100 may be provided with a scheduled operation button 123. The user may select a washing course finishing time point while pressing down the scheduled operation button 123. For an example, the scheduled operation button 123 may be selected to finish the washing course after four hours. The control unit (For an example, the main board shown in FIG. 3) of the washing machine may control operation of the washing machine such that, if a washing course takes two hours, the operation stops for two hours, and, after the two hours are passed, the washing course is carried out.

The scheduled operation button may have a frequency of use lower than other input units. Therefore, it may be preferable to make the setting mode operable with the scheduled operation button. In this instance, an input method to the scheduled operation button is required to be different. For an example, a pressing time period on the scheduled operation button may be made different to make an original scheduled operation function selection and a setting mode operation selection different from each other. That is, functions different from each other is made to be selected depending on a button pressing time period by using one button.

In the meantime, the scheduled operation button may have words of, not "Scheduled Operation, but "Smart Scheduled Operation" indicated thereon, for indicating that the remote management service can be used by using this button, clearly. That is, the user can understand that the"Smart Scheduled Operation" implies that the remote management service can be carried out besides a simple scheduled wash finish time period setting, easily. After selection of the Smart Scheduled Operation, a remote control, such as change of scheduled operation time period, may be carried out through the external terminal as described, later.

As described before, by selection of a particular input unit, for an example, by pressing down the scheduled operation button for more than 3 seconds, the WiFi communication module can be operated in the setting mode. However, separate setting means, for an example, means for displaying or inputting network information connectable to the user information, and the like may be provided to the home appliance 20.

Therefore, it is preferable that the setting mode is accessible through the external terminal. In this instance, it is preferable that the external terminal is a device including the WiFi communication module, character input means, display means, a CPU, OS, and a storage means. As an example, the external terminal may be the notebook or the smart phone.

It may be said that, instead of the WiFi communication module or the home appliance, the external terminal is provided to make the WiFi communication module to access to the AP 30. Therefore, in the setting mode, SSID (Service Set IDentifier; a wireless LAN) information on an accesser point (AP) 30, and user information for registration of the home appliance are received through the external terminal.

The external terminal has accessible SSIDs indicated thereon, and the user selects an SSID which can be connected continuously, for an example, an SSID used in a home. In this instance, if the wireless LAN has security set thereto, the external terminal is required to select the SSID as well as input a password thereof. Therefore, the SSID information may include an SSID password.

Upon reception of the user information and the SSID information, the WiFi communication module is changed to a use mode. In this instance, it is preferable that the user information and the SSID information is stored in the communication module automatically at the time the communication module receives the user information and the SSID information. According to this, the communication module can make continuous communication without an additional setting mode operation, thereafter. That is, the communication module can access to the AP automatically in the use mode with the information. According to this, the home appliance 20 can have wireless LAN communication with the particular AP 30. That is, a short range communication is made available.

In the meantime, the communication module has an address of the server 10 the communication module intends to access. In this instance, it is preferable that the server address is a fixed IP. According to this, in the use mode, the home appliance 20 can communicate with the server 10 through the AP 30. Accordingly, at the time of change to the use mode, the user information and the product information stored in the hone appliance already is registered to the server 10 through the AP, automatically.

In this instance, the user information may be information stored in the server 10 through the user site described before, already. Accordingly, the server 10 compares the user information and the product information already stored therein through the user site 60 to the information received at the time of use mode change, and stores the same therein. With this, the server 10 perceives the particular user and the particular home appliance. Especially, the server 10 perceives a position of the particular home appliance.

In the meantime, the WiFi communication module 25 has a fixed address for the setting mode operation. By inputting the fixed address, the external terminal 40, such as the smart phone or the notebook, can access to the setting mode. That is, the external terminal 40 can access to a web of the setting mode of a WiFi setting modem in the home appliance. The fixed address may be assigned in a form of 192.1.xx.xx. The access to the setting mode by the external terminal 40 implies that the input means and the display means of the communication module 25 can be extended by using the external terminal 40.

Upon access to the web in the setting mode, a product registration page (For an example, FIG. 13) is displayed, and the user can register the product to the server by inputting required information through the product registration page.

Therefore, the user can change the communication module 25 from the setting mode to the use mode through the external terminal 40, easily. It implies that this can be achieved without addition of an extra input unit or display unit to the home appliance 20 or modification thereof. And, the use of the external terminal 40 provided separately can prevent a price of the home appliance from rising.

Referring to FIG. 1, the home appliance 20 may include a state indicating unit 130. Accordingly, through the state indicating unit 130, access to the setting mode and change of the use mode can be carried out, easily. This will be described.

Figure 11:
FIG. 11 illustrates a diagram showing an embodiment of an initial frame of an indicating unit in a home appliance.

Upon pressing the power selection unit 140, the state indicating unit 130 may display guiding words for selection of a washing course as shown in FIG. 11. That is, the home appliance displays guiding words requesting for a user's selection. Of course, such guiding words display may be words initially displayed upon application of power.

Then, it is preferable that, upon putting the setting mode into operation, the state indicating unit 130 indicates that the WiFi setting mode is under operation. As described before, operation of the setting mode may be carried out by selection of a particular selection unit. For an example, by pressing the smart scheduled operation button 123 more than 3 seconds, the setting mode can be put into operation. The user can notice that an operation matched to an order is carried out through the state indicating unit 130, evidently.

And, it is preferable that at least one of the fixed address for access to the setting mode and information on the SSID to be connected is indicated at the state indicating unit 130 in the setting mode. Therefore, the user may input the fixed address to the external terminal easily or access to the SSID of the communication module.

Figure 13:
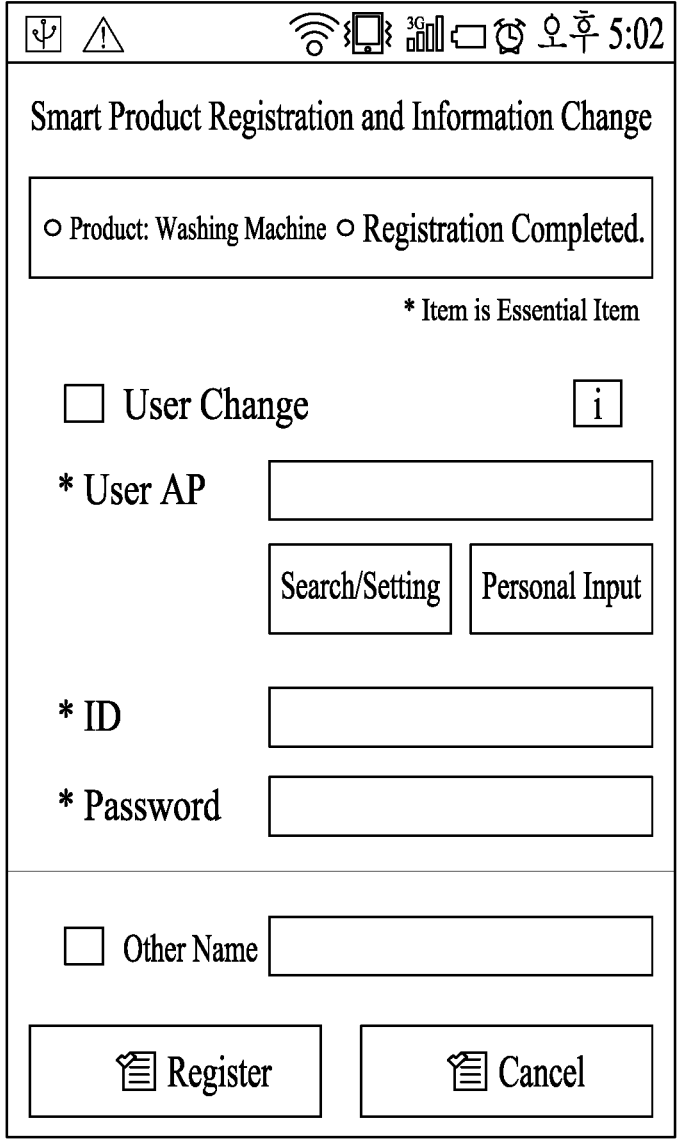
FIG. 13 illustrates a diagram showing an embodiment of a frame of an external terminal at the time the external terminal access to a setting mode.

An example of a frame accessed to the setting mode by inputting the fixed address to the external terminal 40 is shown in FIG. 13. FIG. 13 shows the frame having spaces for inputting the SSID information (An SSID name and/or an SSID password) intended to access, and spaces for inputting a user ID and a password.

The user ID and the password may be information set already through the user site 60 described before. Therefore, if such information is registered, the home appliance 20 can be registered to the server 10.

In this instance, it is preferable that the external terminal 40 can access to the web page of the setting mode only when the setting mode of the home appliance 20 is in an activated state. This is for making the home appliance the user intends to connect to server is the same with the home appliance to be connected to the server, actually.

In detail, as the smart phone inputs the fixed address of the communication module in the home appliance 20 in a state the setting mode of the home appliance 20 is activated, the communication connection between the smart phone and the home appliance can be made to each other. Accordingly, the home appliance can receive user AP information to be connected to the user information through the smart phone, and through this, can be connected to the AP. If the home appliance is connected to the AP, the home appliance is changed to the user mode. In this instance, the home appliance is registered to the server normally through the certification procedure by the server or the user site.

Figure 12:
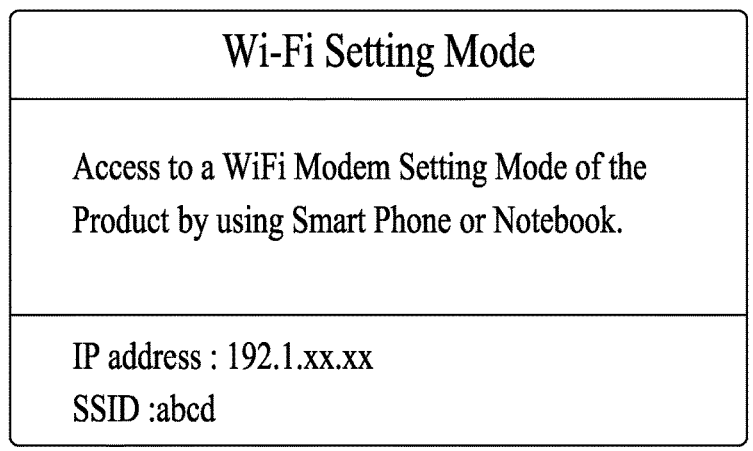
FIG. 12 illustrates a diagram showing an embodiment of a frame in a WiFi setting mode.

And, in the state the setting mode of the home appliance 20 is activated, the smart phone can access to the communication module in the home appliance 20, directly. That is, access to the SSID shown in FIG. 12 through the smart phone will be possible. In other words, connection of the smart phone to the WiFi network (For an example, abed shown in FIG. 12) of the communication module in the home appliance 20 is possible. Upon the WiFi connection between the smart phone and the home appliance, the frame shown in FIG. 13, i.e., the setting mode web page is displayed on the smart phone, through which connection of the home appliance to the user AP in the home may be possible, actually.

Figure 14:
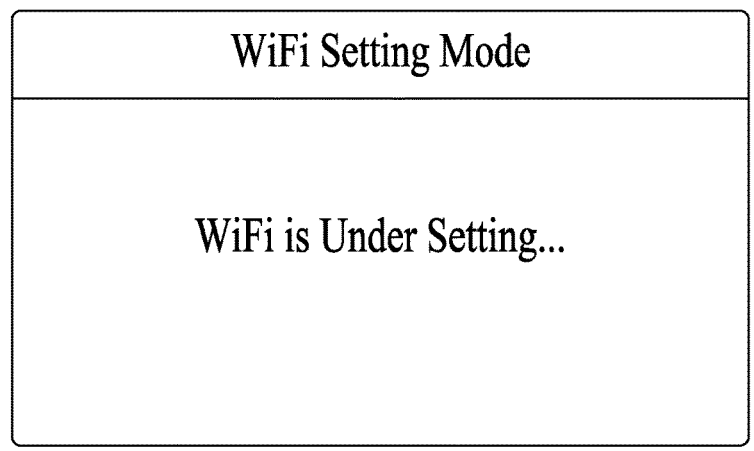
FIG. 14 illustrates a diagram showing an embodiment of a frame of a display unit in a home appliance at the time an external terminal access to a setting mode.

In the meantime, upon inputting the fixed address to the external terminal 40 or inputting the user information and the AP information after the external terminal 40 accesses to the WiFi network of the home appliance 20, a frame, for an example, as shown in FIG. 14, wilt be displayed on the state indicating unit 130. The home appliance, specifically, the WiFi communication module 25, will try access to the user AP with the information received through the smart phone. Therefore, it is preferable that the state indicating unit 130 indicates information that the WiFi is under setting.

Under such WiFi setting, the home appliance 20 may carry out mutual certification procedure with the server or the user site. Therefore, it may be said that, upon finishing the WiFi setting, the home appliance is in a state the home appliance is registered to the server, directly, or through the user site.

Figure 15:
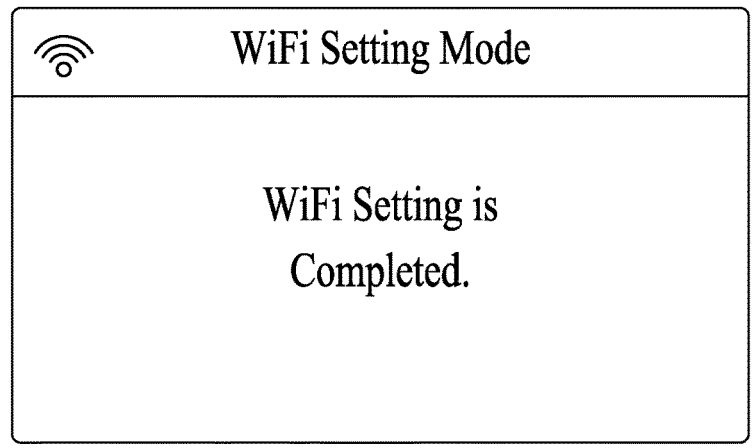
FIG. 15 illustrates a diagram showing an embodiment of a frame of a display unit in a home appliance at the time a setting mode is finished.

Upon finishing the WiFi setting mode, the frame shown in FIG. 14 may be changed to a frame shown in FIG. 15, as an example. That is, information that the WiFi setting is finished is indicated, and along with this, a WiFi icon may be displayed. The WiFi icon may be kept displayed thereafter while the communication connection is done.

Through such steps, the user can register the home appliance to the server, and can connect the home appliance to the server through the AP, easily.

If the setting time period, for an example, the three seconds, is passed, the frame in FIG. 15 changes to the initial frame, i.e., the frame in FIG. 11. Of course, the WiFi icon is added to the frame in FIG. 11, indicating that the WiFi is under connection.

By such characteristics of the state indicating unit 130 and the WiFi communication module in the home appliance, since the user can register the home appliance to the server 10, easily and quickly, the user can use the management service, later.

In the meantime, the external terminal 40 is used, not only as supplementary means for the communication connection of the home appliance, but also enables easy use of the management service for the home appliance. Alikely, this is because the extended input means and display means of the external terminal 40 can be utilized.

For this, the external terminal 40 may be provided with an application for requesting and carrying out at least one of the remote control, the remote diagnosis, the firmware or software update, and the monitoring of the home appliance 20.

The external terminal 40 transmits the user information to the server at an initial running of the application, and communicates with the home appliance of the user, to make the service requested by the home appliance to be carried out. In the meantime, the application can indicate products of which management service is possible, and may be provided such that products the user actually has are selected from the products. If the user's product is not registered to the server, the product may be registered to the server through the application, which may replace the WiFi communication module carrying out the setting mode described before.

Carrying out the management service, particularly the remote control, with the application will be described, in detail.

Figure 16:
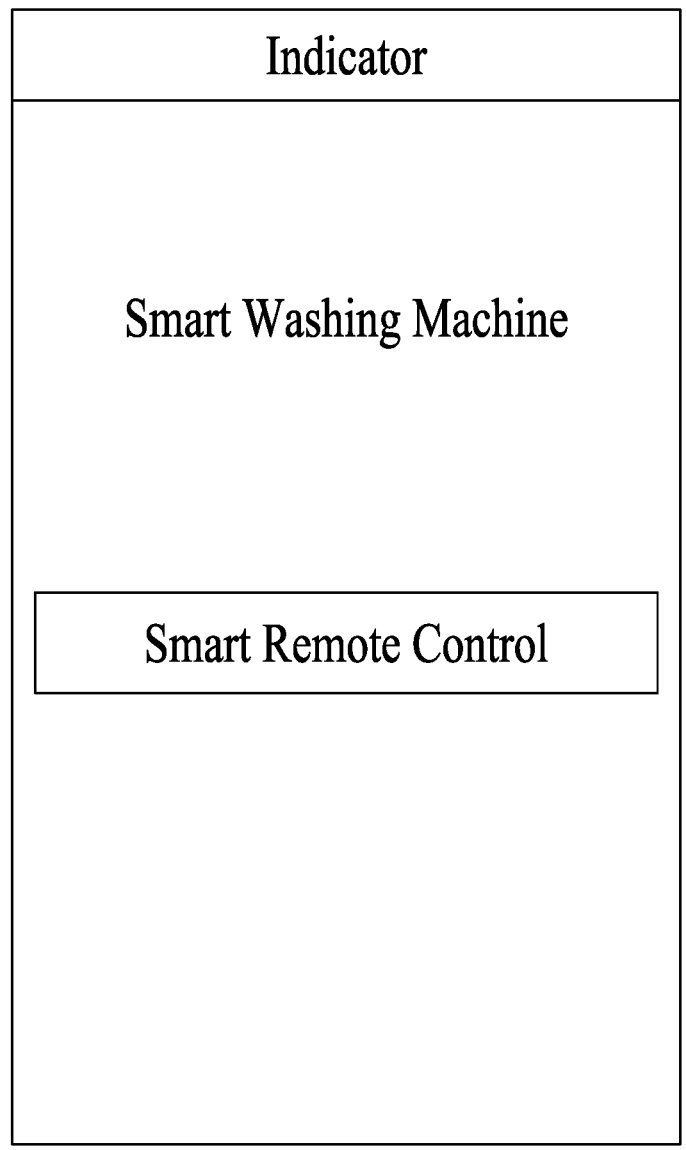
FIG. 16 illustrates a diagram showing an embodiment of an initial frame or an external terminal for remote management of a home appliance through the external terminal.

Upon running the application, as an example, a frame shown in FIG. 16 may be displayed on the external terminal 40. If the user presses the smart remote control thereon, as an example, a frame as shown in FIG. 17 is displayed to log in the server. The user can access to the server by selecting a country (A server selection), and inputting the user ID and password.

In this instance, the server selection may be indicated only in a case one of a plurality of servers is selected. Along with this, the selection of the server may be indicated for selection of a language to be used.

The log-in frame may be displayed in a case of initial log-in, and the log-in frame may be displayed automatically, thereafter. However, since other person may run the application freely, it is preferable that log-in is made upon reception of at least the user password every time the application is run.

After log-in, the server determines whether the user is registered or not. If not, the external terminal may display the user site to request registration, or may be connected to the user site, directly. Of course, such display of the user site may also be displayed on the log-in frame.

If the user is registered, e server will know whether the user's home appliances are registered or not. Therefore, the external terminal will display the home appliances registered thus if any. If the registered home appliances are plural, the user may select a particular one of the home appliances for having service provided thereto. Then, the user may request the management service for the particular product through the application.

In the meantime, if the user's home appliance is not registered to the server, by selecting a product registration method shown in FIG. 17, the user may register the home appliance to the server. Therefore, the server determines whether the user's home appliance is registered or not when the user logs in.

Even in a case the user's home appliance is not registered to the server, such information may be indicated, and the user may register the home appliance easily by selecting the product registration method shown in FIG. 17 and carrying out a registration procedure. The registration method is the same with one described before.

The application may be one for a particular product group, for an example, the laundry machine (The washing machine, the dryer, the refresher, and so on), or, a particular product, for an example, the washing machine. Therefore, the user's running of the application implies a service request for the particular product group or the particular product. Therefore, the user's running of the application implies inputting of user information on the particular product group or the particular product to log-in the server. Therefore, after the log-in, the server determines whether the home appliance is registered together with the user information or not.

Figure 18:
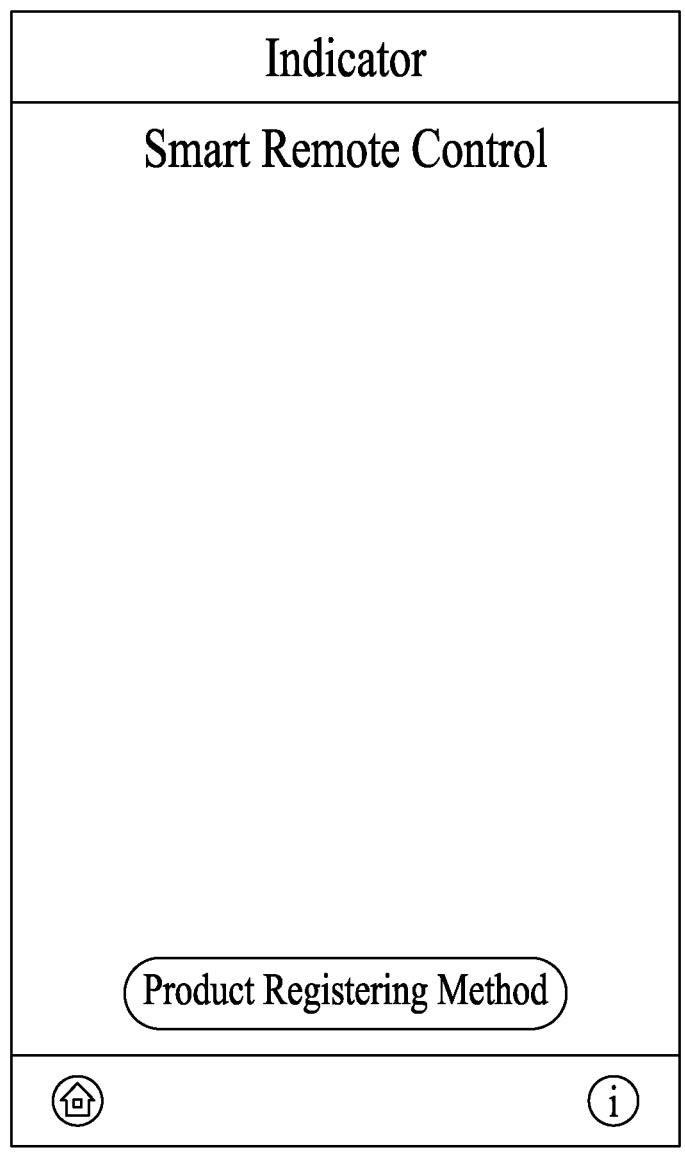
FIG. 18 illustrates a diagram showing an embodiment of a frame in a case a home appliance is not registered to a server.

After the user log-in, if the product related to the application is not registered, no product is indicated as shown in FIG. 18 as an example. Therefore, through the frame, the product registration is possible.

The user's selection of the product registration method shown in FIG. 17 or 18 implies user's access to the home appliance setting mode described before. That is, the user's selection of the product registration method implies that the application accesses to the fixed address of the setting mode of the WiFi communication module in each of the home appliances. Matters related to the external terminal and the state indicating unit 130 in the home appliance may be the same with matters described with reference to FIGS. 10 to 15.

In the meantime, things important at the time registration of the product to the server are making the server to know the product is whose and where. Therefore, at the time of the product registration, it is required to transmit the user information to the server, as well as information on the AP address. It may be said that the access to the setting mode of the WiFi communication module described before is for matching the user information to the product. Therefore, there is no necessity of signal transmission/reception between the external terminal and the home appliance.

For an example, by operating the setting mode, the home appliance can find the user AP for itself. And, the AP information, the home appliance information (For an example, whether the home appliance is the washing machine or not), and the user information can be transmitted to the server or the fixed address site through the external terminal. Therefore, the server can understand that the home appliance intending to connect to the particular AP is whose home appliance, and what kind of home appliance from such information. And, the user information may be transmitted to the communication module and stored therein.

With this, protocol setting or addition of hardware for signal transmission/reception between the communication module in the home appliance and the external terminal is not required. Therefore, the home appliance can be registered to the server without addition of expense.

Of course, as described before, it may also possible that the communication module in the home appliance 20 is made to have one sided reception of the signal through the smart phone. That is, the communication module receives the user information and the user AP information through the smart phone simply, and, by using this, the communication module may be connected to the server through the smart phone, too. Alikely, even in this case too, the protocol setting or addition of hardware for signal transmission/reception between the communication module and the external terminal is not required.

It implies that the home appliance 20 is not controlled remotely through the smart phone directly by direct communication of the home appliance 20 with the smart phone. That is, it implies that the smart phone communicates with the server, but not with the home appliance, directly. In other words, it implies that the remote management service is made through the server. With this, since the home appliance 20 does not require means for communication with the external terminal, such as the smart phone, price increase of the home appliance can be limited. And, the server can make various user career management, user information accumulation and renewal, and user taste analysis. Accordingly, order made service can be provided, and the information can be used in a variety of forms.

The user is made possible to register the home appliance to the server more easily by using the application. And, a variety of the management services described before may be carried out by using the application.

Up to now, methods or procedures for registering the user and the home appliance to the server, and characteristics of the home appliance and characteristics of the online service for above have been described in detail.

Embodiment for embodying the online service for the home appliance by using the external terminal after the user and the home appliance are registered to the server will be described, in detail. Particularly, embodiment on the remote control of the washing machine will be described, in detail.

If it is intended to make description easy, the remote control implies controlling the operation and the like of the washing machine with the application at the external terminal, such as the smart phone. In order to make it easy, the server is provided between the smart phone and the washing machine.

In a case of the washing machine, unconditionally possible remote control is not desirable. This is because the remote control is meaningless in a case the washing machine is not ready to operate, such as a case a door on the washing machine is opened, a case no detergent is introduced to the washing machine, and so on.

Therefore, in order to make the remote control possible selectively, the washing machine may be provided with a remote control selection unit. If remote control is selected, such information may be transmitted to the server. Of course, if the user requests the state information on the washing machine through the application, the user may receive the information from the server.

The remote control selection unit may be the scheduled operation selection unit 123 shown in FIG. 1, in more detail, the smart scheduled operation selection unit 123. In order to activate the scheduled operation selection unit 123, i.e., to carry out the scheduled operation, it is required to select an operation button 150. Therefore, it is preferable that the remote control is possible through the external terminal only if the remote control is activated at the washing machine.

The remote control activation at the washing machine can be made by scheduled operation function selection at the scheduled operation selection unit 123 and selection of the operation button 150.

As described with reference to FIGS. 16 and 17, the user can log-in the server by transmitting the user information to the server through the external terminal. If the application is for remote control of a service for a particular product, for an example, the washing machine, the user information and the washing machine information will be received at the server in a log-in step.

If the application is for services for a plurality of products, only the user information will be received at the server in the log-in step. As the user selects a particular product after the log-in step, information on the particular product will be received at the server. If a service objective product is selected after completion of, or after, the log-in, the user can request the service for the objective product.

The user requests the state information on the washing machine to the server. A frame of the external terminal for the request is shown in FIG. 16. That is, by selecting the smart remote control indicated on the external terminal, the user can request the server for the state information on the washing machine.

The server determines a washing machine matched to the user information and the washing machine information. That is, the server determines the present AP the washing machine is in access thereto. And, the server requests the state information to the washing machine.

In response to the request, the washing machine transmits the state information to the server, and the server transmits the state information received thus to the external terminal. The external terminal receives and displays the state information.

Figure 19:
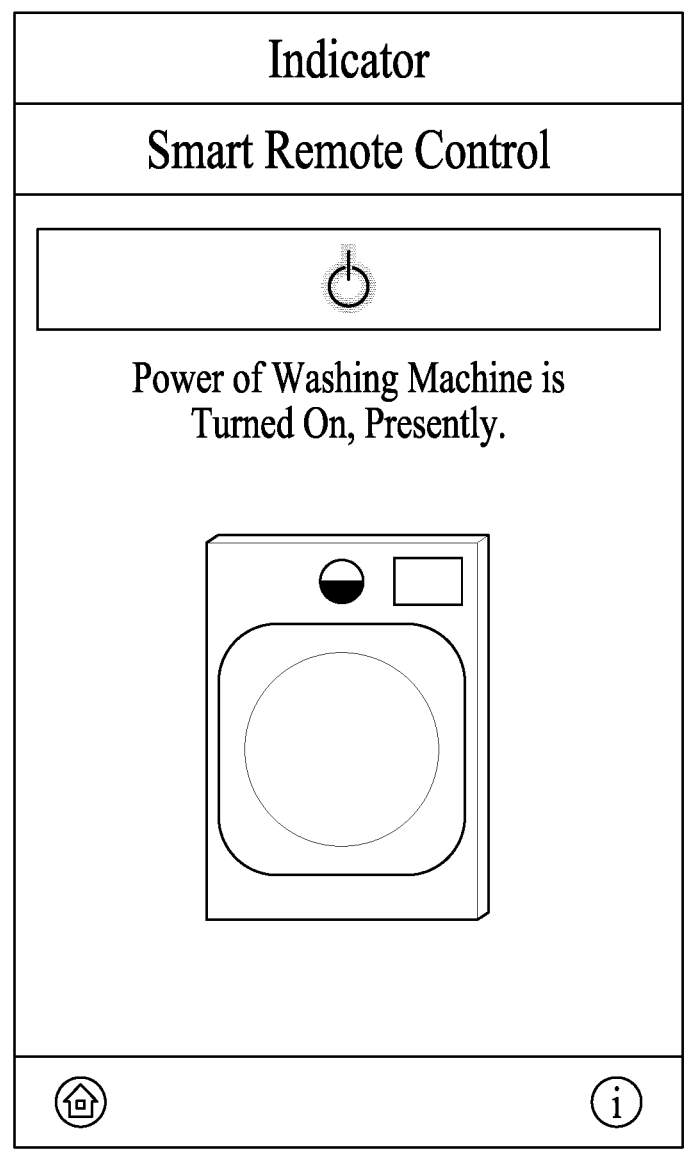
FIG. 19 illustrates a diagram showing an embodiment of a frame indicating a turned on state of power to a home appliance.
Figure 20:
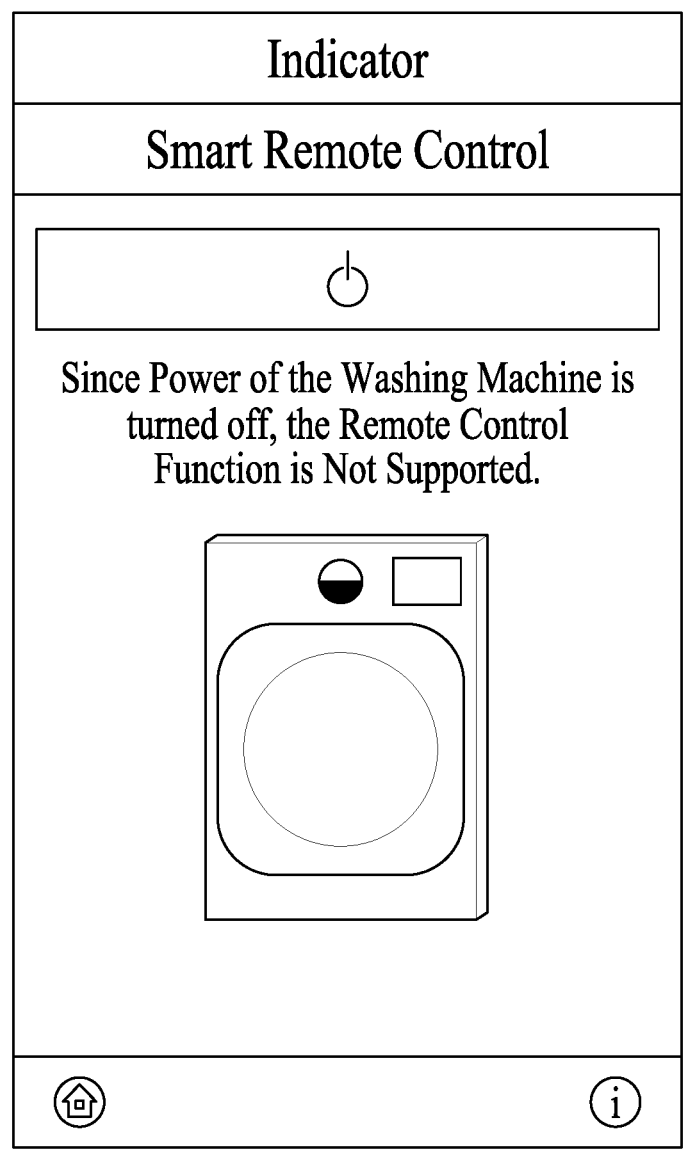
FIG. 20 illustrates a diagram showing an embodiment of a frame indicating a turned off state of power to a home appliance.

The state information may include whether power of the washing machine is turned on or not. FIGS. 19 and 20 illustrate examples which indicate a case of power turn on and a case the power turn off on the external terminal, respectively.

Referring to FIG. 19, the user may turn off power of the washing machine by selecting the power selection unit. However, as shown in FIG. 20, if the power of the washing machine is turned off, the remote control function is not carried out, and it is preferable that this is indicated. Since the remote control function is not carried out, the power of the washing machine can not be turned on.

In the meantime, referring to FIG. 19, if only a power turn on state is indicated, the washing machine is in a state only the power is turned on while the washing machine does not make any operation. The washing machine is configured to turn off the power automatically when selected operation is finished. Therefore, the state only the power is turned on may be a case the operation button is not selected yet after the power is turned on for selecting a washing course or the like. Therefore, in this case, it is preferable that the washing machine is configured such that power thereof can be turned off by the remote control in a state only the power is simply turned on.

In this instance, the turning off of the power through the external terminal may also be one of the remote controls. Therefore, in the state only the power is turned on simply, it can be made that the turning off of the power is not possible. That is, it can be made that only monitoring of the present state is possible, simply.

Alikely, the washing machine may be configured to be able to monitor whether the present state of the washing machine is under a washing course, or under a washing cycle, a rinsing cycle, spinning cycle, or drying cycle in the washing course through the external terminal. This case may be a case the remote control activation described before is not made.

That is, if the remote control activation of the washing machine is not made, external terminal may be configured to be able to monitor the present state of the washing machine only, but can not make the remote control. In other words, the external terminal may be configured such that remote operation or control of hardware for carrying out basic functions of the washing machine, for an example, hardware related to drum drive, water supply, or the like, is not possible.

In the meantime, alikely, if the remote control activation of the washing machine is made, the external terminal may be configured to be able to monitor the present state of the washing machine as well as to carry out remote operation or control. Therefore, it is preferable that the server receives the remote control activation information of the washing machine from the washing machine.

If the server can not receive such information because the remote control activation of the washing machine is not made, the user can not remote control the washing machine through the external terminal. Of course, this fact may be indicated on the external terminal or indication on the remote control may not be indicated on the external terminal.

As described before, the remote control activation may be made of a smart scheduled operation input and operation input. A state of the washing machine thereafter will be any one of a standby state for carrying out a scheduled operation course, a course carrying out state, or a course finish state. Of course, the state of the washing machine thereafter may be a crumple preventive state to be described later after finish of the course. And, the state of the washing machine thereafter may be a power turned off state after the course finish or the crumple prevention finish. In more detail, a course carrying out state may include under a washing cycle, under a rinsing cycle, and under a spinning cycle, and may further include under a drying cycle.

Accordingly, if the remote control is activated in the states of the washing machine described before excluding a case the power turn off, the user can carry out a variety of modes of the remote control through the external terminal.

Figure 21:
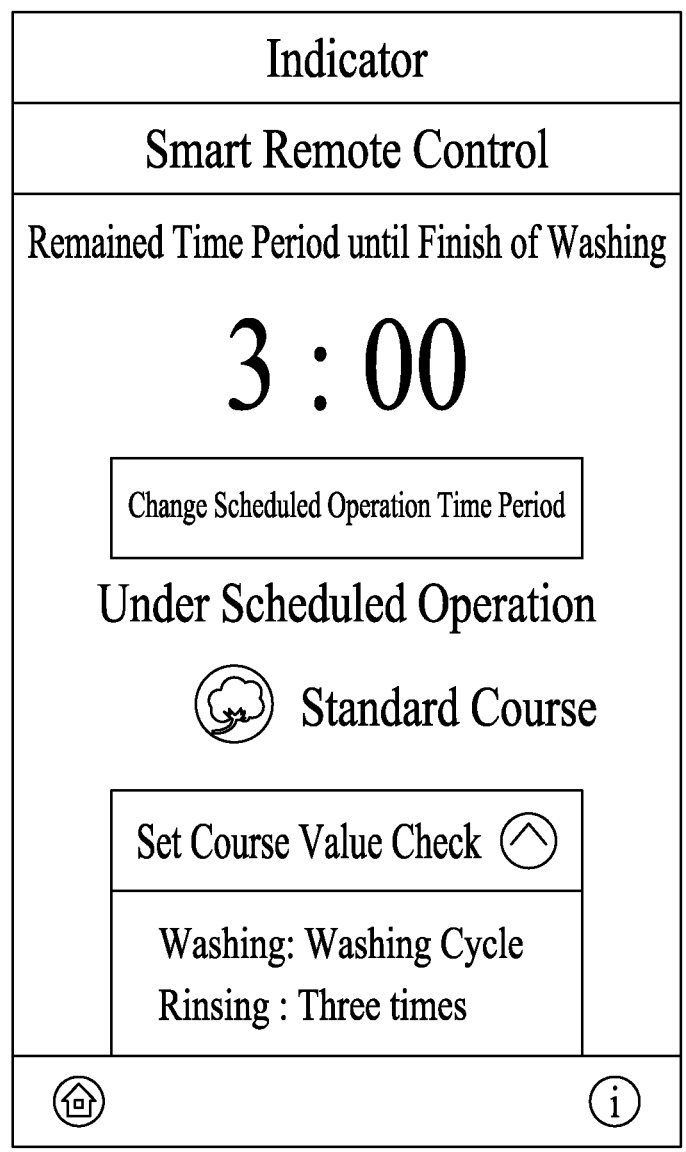
FIG. 21 illustrates a diagram showing an embodiment of a frame indicating a case of a scheduled operation.

FIG. 21 illustrates a diagram showing an example of indication on the external terminal when washing machine is in a scheduled operation state, wherein the indication may include at least one of a remained time period until operation finishes, a selected washing course, detailed option of the selected course, and a scheduled operation time period change selection unit.

In this instance, the scheduled operation state, i.e., the under scheduled operation, implies that the washing will be finished when a set time period passes from now, i.e., when an indicated time passes, meaning that the washing is not carried out, presently.

Figure 22:
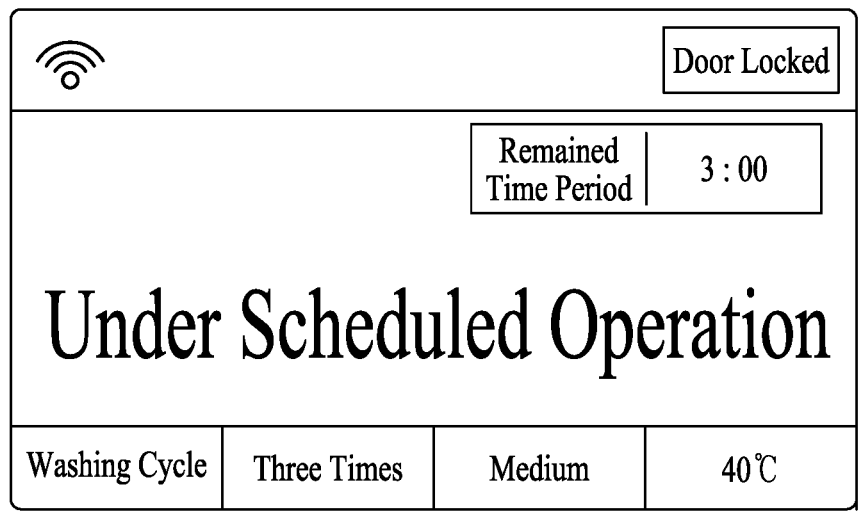
FIG. 22 illustrates a diagram showing an embodiment of a frame of a display unit in a home appliance matching to FIG. 21.

FIG. 22 illustrates a diagram showing the state indicating unit 130 in the washing machine matching to the indication on the external terminal in FIG. 21. Alikely, the state indicating unit 130 may indicate that the washing machine is under scheduled operation, the remained time period, and detailed options.

If the washing machine is under scheduled operation, the user may change a scheduled operation time period through the external terminal. That is, by pressing the scheduled operation time period change shown in FIG. 21, the user can change the scheduled operation time period. Of course, this is under the assumption that the remote control activation is possible. As described before, this is because the scheduled operation state is under the assumption that the remote control activation is possible.

When the washing machine is under the scheduled operation, the detailed option of the scheduled washing course, i.e., a detailed value of the set course, may be checked or changed, and power of the washing machine may be turned off.

Figure 23:
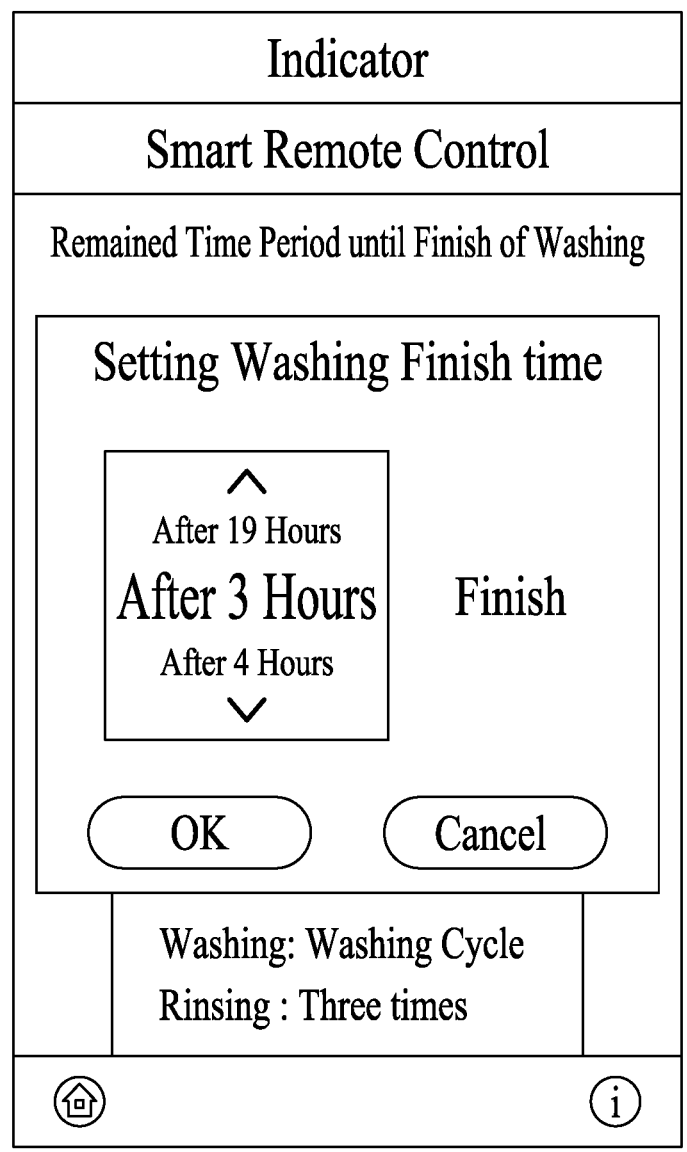
FIG. 23 illustrates a diagram showing an embodiment of a frame for changing a scheduled operation.

FIG. 23 illustrates a diagram showing an example of a popup window displayed if the scheduled operation time period change is selected. The user may change the scheduled operation time period through the popup window, as necessary. If the scheduled operation time period change is noticed, or cancelled, the popup window will disappear and will turn to the frame shown in FIG. 21. In this instance, a remained time period until finishing of the washing will be indicated as a changed time period. That is, if three hours is changed to four hours, the three hours in FIG. 21 will be changed to four hours.

Figure 24:
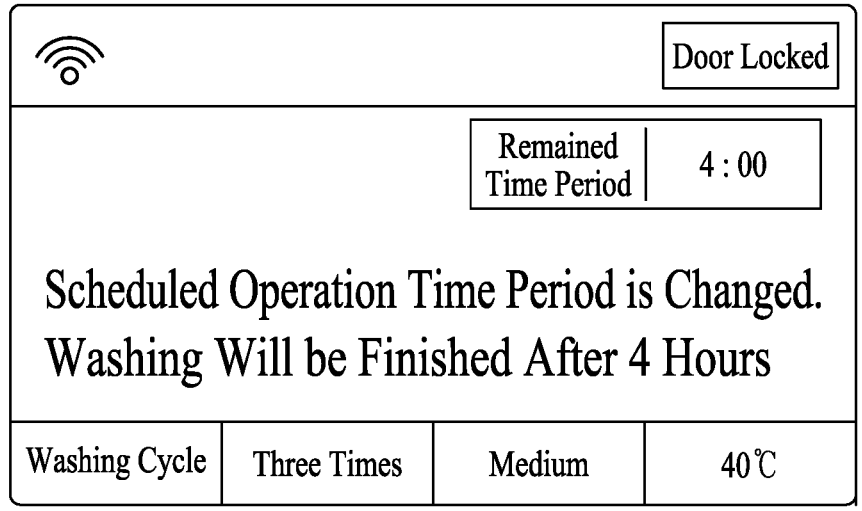
FIG. 24 illustrates a diagram showing an embodiment of a frame of a display unit in a home appliance after change of a scheduled operation.

FIG. 24 illustrates a diagram showing an example of the state indicating unit 130 in a case the scheduled operation time period is changed through the external terminal. In this case, information on the scheduled operation time period change and information on the remained time period is displayed. Thereafter, if a set time period passes (For an example, three seconds), the frame of FIG. 24 changes to the frame of FIG. 22. Of course, the frame will indicate the remained time period of four hours changed thus from three hours.

Figure 25:
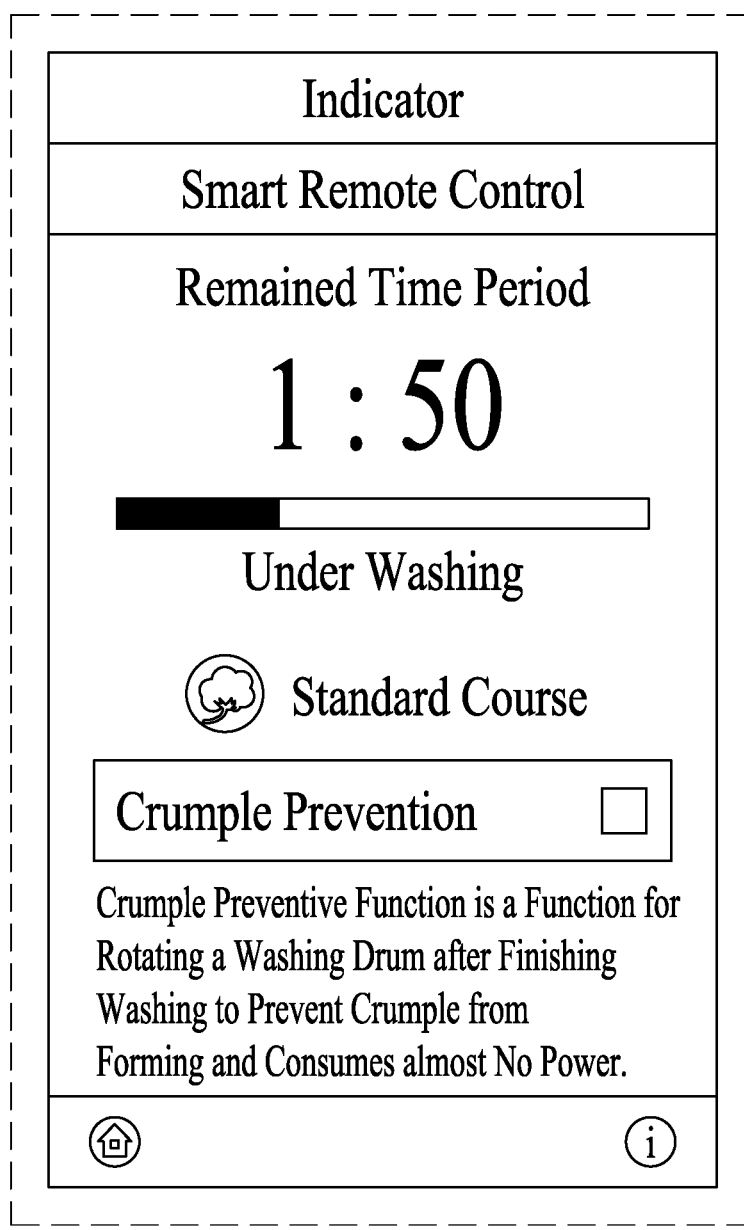
FIG. 25 illustrates a diagram showing an embodiment of a frame displayed at an external terminal during operation of a home appliance.

FIG. 25 illustrates a diagram showing an example of a frame displayed at the external terminal while the washing machine is in operation, wherein the external terminal may indicate at least one of a remained time period until operation finish, indication of detailed cycle progress, and detailed option of the set course. That is, the frame may be a frame displayed if the scheduled operation is selected, and a scheduled washing course is being carried out. In detail, the frame may display the selected course, as well as a detail cycle in the course, i.e., whether the washing machine is under washing or rinsing.

Figure 26:
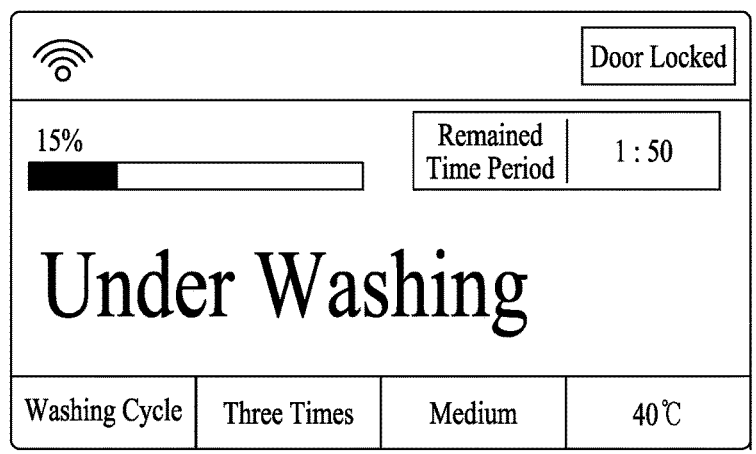
FIG. 26 illustrates a diagram showing an embodiment of a frame of a display unit in a home appliance matching to FIG. 25.

FIG. 26 illustrates a gram showing an example of a frame of the state indicating unit 130 in the washing machine matching to the frame in FIG. 25. The frame may indicate a remained time period until course finish, an extent of progress of an entire course. Along with this, the frame may indicate whether the washing machine is under washing, rinsing, or spinning. Of course, the frame may also indicate whether the washing machine is under drying.

In the meantime, the user may select the crumple preventive function through the external terminal during operation of the washing machine, i.e., before finishing the course. That is, by selecting the crumple prevention indicated on the frame in FIG. 25, the user may select the washing machine to carry out the crumple preventive function.

The crumple preventive function is a function for driving the drum after finishing the course to prevent the crumple from forming at the laundry. If the washing or rinsing is finished, the laundry in the drum is pressed down on a bottom of the drum due to gravity of the laundry. Particularly, if the washing is finished, the laundry has moisture remained therein, which is liable to cause the laundry to form the crumple by a load of the laundry, particularly when the laundry is entangled.

Accordingly, consistent and periodic or intermittent driving of the drum is required for crumple prevention.

The dryer, or a washing and drying machine can supply cold air to the laundry. Therefore, consistent and periodic, or intermittent supply of the cold air may also be viable.

The crumple preventive function is effective in a case the laundry is left for a long time period in the dram after finishing the course. Therefore, the crumple preventive function can be selected and carried out only through the external terminal. That is, the control panel at the washing machine, the dryer, or the washing and drying machine may not be provided with the selection unit for selecting such a function. This is because it is less liable that the laundry is left in the drum for a long time period if the user handles the control panel to carry out the washing.

Therefore, it is preferable that, if the user makes a scheduled washing operation during the user is out or attends to his (her) office, i.e., only if the remote control is activated, the function is selected through the external terminal.

Referring to FIG. 25, by selecting the crumple preventive function indicated on the external terminal, the user can select the crumple preventive function. It is preferable that a time period required for carrying out the crumple prevention is inputted in default. For an example, the time period is set to be four hours in advance. This is because the laundry is liable to be left for a long time period the same as before if the time period is set only to be short. And, the crumple preventive function can be cancelled if the user presses any button at the washing machine if the time period is set to be long.

For an example, referring to FIG. 25, if an hour and fifty minutes is remained until finish of the washing, and three hours is remained until the user arrives at home, the user can select the crumple preventive function. Therefore, since the crumple preventive function has been carried out even if the user arrives at home after five hours, and the user can stop operation of the washing machine by pressing any button.

Figure 27:
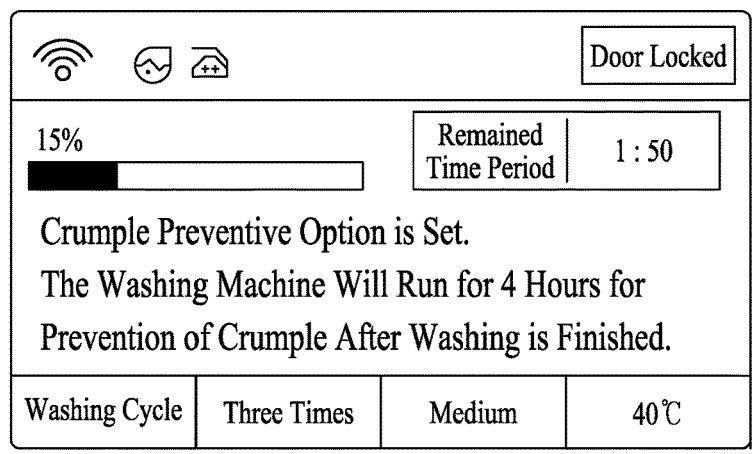
FIG. 27 illustrates a diagram showing an embodiment of a frame of a display unit in a home appliance after selection of crumple prevention at a frame shown in FIG. 25.

FIG. 27 illustrates a diagram showing an example of an indication state of the state indicating unit in the washing machine if the crumple preventive function is selected at a frame of the external terminal shown in FIG. 25, indicating that the crumple preventive function is selected instead of the information of under washing at a prior frame shown in FIG. 26. And, a time period the crumple preventive function is finished may be indicated. Then, it is preferable that, after a set time is passed, the frame is changed to the frame shown in FIG. 26, i.e., the prior frame.

FIG. 28 illustrates a diagram showing an example of the state indicating unit in the washing machine if carrying out the course is finished. If no crumple preventive function is carried out, the power of the washing machine will be turned off after a certain time period is passed. However, as shown in FIG. 29, if the crumple preventive function is carried out, the frame may indicates that the crumple preventive function is being carried out. In order to make the user to understand a present washing machine state more clearly, it may be possible that the frame shown in FIG. 28 and the frame shown in FIG. 29 may be displayed alternately for a predetermined time period.

Thus, an embodiment on user's active state information determination on the home appliance, particularly, the laundry machine through the external terminal, has been described. That is, an embodiment has been described, in which the user runs the application to determine a state of the laundry machine by remote monitoring or remote control.

Different from the embodiment, active provision of the state information on the laundry machine from the server or the laundry machine to the user will be possible. That is, active provision of the state information on the user's laundry machine to the user's external terminal will be possible.

The server may have information including a telephone number of the user stored therein. Therefore, it may be possible that the server provides the state information on the laundry machine to the user's external terminal, such as the smart phone, in a triode of a message.

And, if the user's external terminal has the remote control application running therein, the external terminal, the server, and the laundry machine are under communication with one another. Therefore, it may also be possible to provide the state information on the laundry machine from the application in a mode of a push message.

In this instance, it is not preferable to provide the state information to the user every time the washing machine is operated. Therefore, it is preferable that there is a certain limitation in providing the information. To do this, the remote control activation input means described before may be used. That is, it may be made possible that, only if the remote control activation input means is selected, the external terminal receives the state information on the laundry machine. The input means may be input means like a button provided to the home appliance, separately. Of course, as described before, the input means may be an operation button, like the scheduled operation button, if the home appliance is the washing machine. Accordingly, as the remote control activation is made to be inputted at the home appliance which has the remote control service directly provided thereto, malfunction, or over issue of information provision through the external terminal can be prevented in advance.

For an example, a situation may take place, in which the washing machine is remotely controlled through the external terminal from an outside of the home and the washing machine is directly operated at the home. That is, it is liable that the same washing machine may be subjected to a plurality of control manipulation. In order to prevent this, the remote control activation input is required. That is, such activation implies that the remote control will be made at least through the external terminal.

As an example, in a situation both members of a couple leave the office late, if both of the members set scheduled washing operation at their office leaving times, a scheduled operation time period may be changed by the remote control. In this instance, it is possible to carry out the washing at once after cancelling the scheduled operation at once if one of the members leaves the office earlier than expected. This is because this case does not require the remote control.

Since the home appliance, like the washing machine, is not in operation always, it is preferable that the operation button is included to the activation input means. However, the home appliance which is in operation always, like the refrigerator, may have the remote control activation set thereto through one input button or input means. According to this, in many cases, the home appliance, like the refrigerator, is in a state the remote control activation is selected.

The push message may be provided until finish of the washing or finish of the crumple prevention at preset time intervals. Of course, the push message will provide updated state information on the laundry machine.

The state information on the laundry machine may include any one piece of information on starting of carrying out the washing course, on finishing of carrying out the washing course, ort the crumple preventive function carried out after the finishing the carrying out of the course.

The information on starting of carrying, out the washing course may include any one piece of information that the washing will be started after a particular time period is passed, and information that the washing is started. And, the information on the crumple, preventive function may include any one of information that the crumple preventive function is starting after finishing the washing, and information that the crumple preventive function is finished.

The state information on the laundry machine may include information on which cycle is being carried out among washing, rinsing, spinning, and drying in the present course being carried out, in detail.

Figure 30:
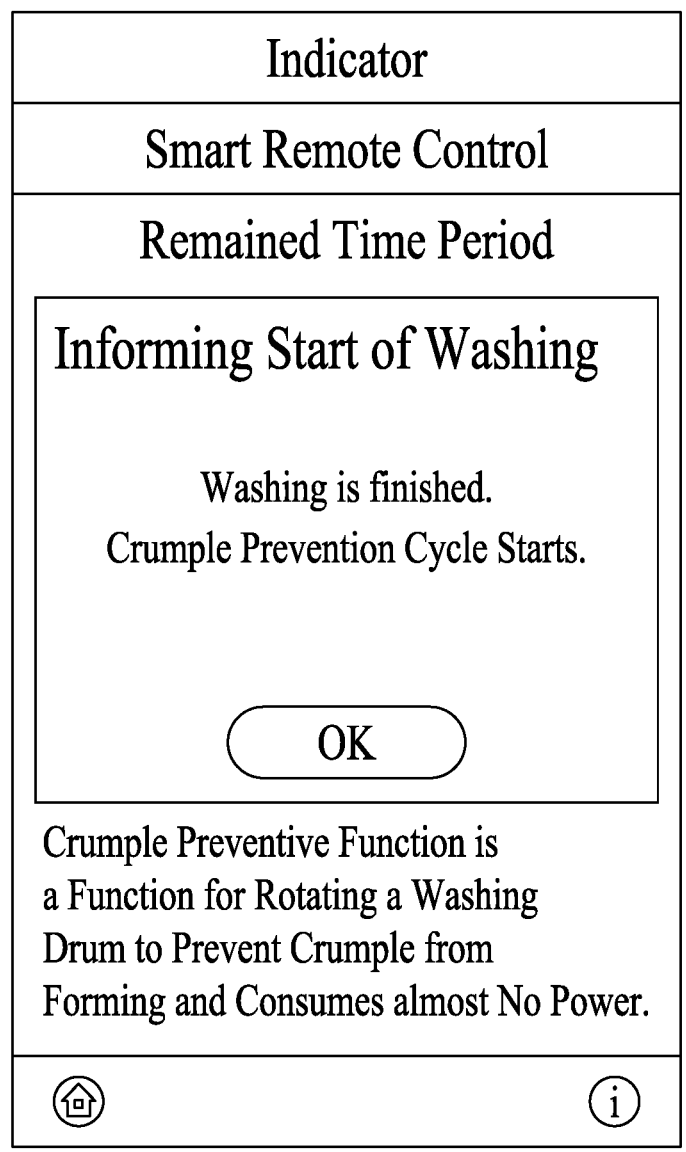
FIG. 30 illustrates a diagram showing an embodiment of a frame providing a state of a home appliance to an external terminal in a push message.

FIG. 30 illustrates a diagram showing an example of a frame provided in a push message during the external terminal runs the application. In detail, the push message is one informing that the crumple prevention is being carried out as the washing is finished. The push message may be provided in a mode of a popup window, and upon pressing a notice button, the popup window may be closed.

In the meantime, it is possible that the state information on the laundry machine is owned, not only by the user, but also by persons related to the user, in common. That is, it is possible to own the information by using SNS (Social Network Service).

The server may have user information including user's SNS account information, and information on the laundry machine. Through the user site or the external terminal described before, the server may have the information stored therein. Therefore, if necessary, the laundry machine or the server may provide the state information on the laundry machine to the user's SNS account. Alikely, such provision of information can be made on the assumption of inputting the remote control activation input means as described before.

In the meantime, as described before, on the assumption of inputting the remote control activation input means, the user can control the laundry machine remotely through the external terminal. For an example, the provision of information through the SNS may be different from a case the user does not make separate remote control, to a case the user makes the remote control after the inputting the remote control activation.

For an example, the user may change the scheduled operation time period or select the crumple preventive function through the external terminal. Therefore, the server can provide remote control information to the SNS account of the user only if such an example of remote control is carried out.

If the user changes the scheduled operation time period through the external terminal, the server may register that the scheduled operation time period of the washing machine is changed through the smart phone to the user's SNS account. According to this, the persons related to the user may own the information through the SNS, in common.

Eventually, since a smart phone function for selection of the crumple preventive function or changing the scheduled operation time period through the external terminal can be owned in common, product satisfaction can be enhanced, significantly.

It will be apparent to those skilled in the art that various modifications and variations can be made in the present invention without departing from the spirit or scope of the invention. Thus, it is intended that the present invention cover the modifications and variations of this invention provided they conic within the scope of the appended claims and their equivalents.

INDUSTRIAL APPLICABILITY

Described in the Detailed Description of the Present Invention.

The invention claimed is:

1. A method for using an online system comprising:
transmitting, from an external terminal to a server, user information to log in to the server;
receiving, at the server, the user information and home appliance information;
transmitting, from the external terminal to the server, a request for state information on the home appliance;
determining, at the server, a home appliance that matches the user information and the home appliance information received at the server;
after the server determines the home appliance that matches the user information and the home appliance information, transmitting, from the server and to the home appliance, a request for state information regarding the home appliance;
in response to transmitting the request for state information, receiving the state information from the home appliance;
transmitting, from the server to the external terminal, the state information; and
receiving, at the external terminal, the state information transmitted from the server, and displaying the state information on the external terminal.

2. The method as claimed in claim 1, comprising receiving, at the server and from the home appliance that is powered on and has received selection of a remote control activation means, a remote control activation information of the home appliance, wherein the home appliance is remotely controlled through the external terminal via the server only when the remote control activation input means is selected.

3. The method as claimed in claim 1, wherein receiving the user information and the home information includes receiving, at the server, the user information and the home information on a particular home appliance at the server for requesting service for the particular home appliance after the log in.

4. The method as claimed in claim 1, wherein receiving the user information and the home information includes receiving, at the server, the user information and the home information of a plurality of home appliances for requesting service for the plurality of home appliances after the log in.

5. The method as claimed in claim 1, wherein the home appliance is a laundry machine, and the state information includes any one of:
information on whether power of the laundry machine is turned on or off,
information on whether the laundry machine is in scheduled operation or not, and
information on whether the laundry machine is in operation or not.

6. The method as claimed in claim 5, further comprising when power is turned on at the home appliance, transmitting, from the external terminal to the server, an order for turning off the power at the home appliance.

7. The method as claimed in claim 5, wherein when the laundry machine is in scheduled operation, at least one of a remained time period until finish of operation, a selected washing course, detailed option of the set course, and a scheduled operation time period change selection unit is indicated at the external terminal.

8. The method as claimed in claim 7, wherein when the scheduled operation time period change selection unit is selected, a popup window is produced for enabling change of a time period remained until finish of operation, and when the remained time period is changed and noticed or the change is cancelled, the popup window disappears.

9. The method as claimed in claim 5, wherein when the laundry machine is in operation, at least one of a remained time period until operation finish, indication of detailed cycle progress, and detailed option of the set course is indicated on the external terminal.

10. The method as claimed in claim 5, wherein when the laundry machine is in operation carrying out a course, a crumple prevention selection unit is indicated at the external terminal to enable to select a crumple preventive function for preventing the crumple from forming at the laundry machine by driving a drum after finishing the course.

11. The method as claimed in claim 10, wherein the crumple preventive function is selected and carried out only through the external terminal.

12. The method as claimed in claim 5, further comprising:
when the state information received and thus indicates that the laundry machine is carrying out a course, indicating a crumple prevention selection unit at the external terminal, to enable to select the crumple preventive function for preventing crumple from forming at the laundry machine by driving a drum after finishing carrying out the course; and
when the crumple prevention selection unit is selected, transmitting crumple prevention selection information to the server.

13. The method as claimed in claim 12, wherein the crumple preventive function is selected and carried out only through the external terminal.

14. The method as claimed in claim 12, wherein, when the crumple prevention selection unit is selected at the external terminal, a popup window is produced for enabling to change a time period required for crumple prevention, and when the time period is changed and noticed or the change is cancelled, the popup window disappears.

15. The method as claimed in claim 12, wherein descriptive words are indicated for describing the crumple preventive function, together with the crumple prevention selection unit.

16. The method as claimed in claim 12, further comprising when the crumple prevention selection unit is selected, transmitting the crumple prevention selection information to the laundry machine through the server and displaying on a display of the laundry machine.

17. The method as claimed in claim 16, further comprising indicating that the laundry machine is carrying out the course on the display after a certain time period is passed.

18. The method as claimed in claim 16, wherein when the crumple preventive function is carried out after finishing the washing course, an indication that the finishing of washing and an indication that the crumple prevention is being carried out are displayed on the display unit, alternately.

19. The method as claimed in claim 5, further comprising:
when the state information received and indicated thus indicates that the laundry machine is in scheduled operation, indicating that at least one of a remained time period until finish of operation, a selected washing course, detailed option of a set course, and a scheduled operation time period change selection unit at an external terminal;
when the scheduled operation time period change selection unit is selected, transmitting change information to the laundry machine through the server, and indicating the scheduled operation time period change information at a display at the laundry machine; and
indicating that the laundry machine is in scheduled operation at the display after a certain time period is passed.

20. The method as claimed in claim 1,
wherein the home appliance is provided with a remote control activation input means, and wherein the home appliance is remotely controlled through the external terminal only when the remote control activation input means is selected by a user.

21. The method as claimed in claim 20, wherein the remote control activation input means is a scheduled operation button and an operation button provided at the home appliance.

22. The method as claimed in claim 21, wherein the remote control activation is achieved when the scheduled operation button is selected and the operation button is selected.

23. The method as claimed in claim 20, wherein when the remote control activation input means is not selected, monitoring of a present state of the home appliance is possible from the external terminal through the server.

* * * * *